United States Patent
El Hamss et al.

(10) Patent No.: US 12,114,196 B1
(45) Date of Patent: Oct. 8, 2024

(54) METHODS AND APPARATUS FOR ENABLING FREQUENCY LAYERS FOR POSITIONING

(71) Applicant: InterDigital Patent Holdings, Inc., Wilmington, DE (US)

(72) Inventors: Aata El Hamss, Laval (CA); Fumihiro Hasegawa, Westmount (CA); Moon Il Lee, Melville, NY (US); Tuong Hoang, Montreal (CA); Erdem Bala, East Meadow, NY (US); Paul Marinier, Brossard (CA); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/675,514

(22) Filed: May 28, 2024

Related U.S. Application Data

(63) Continuation of application No. 18/633,178, filed on Apr. 11, 2024, which is a continuation of application No. PCT/US2022/078095, filed on Oct. 14, 2022.

(60) Provisional application No. 63/395,951, filed on Aug. 8, 2022, provisional application No. 63/334,826, filed on Apr. 26, 2022, provisional application No. (Continued)

(51) Int. Cl.
*H04W 24/10* (2009.01)
*G01S 5/02* (2010.01)
*H04L 5/00* (2006.01)

(52) U.S. Cl.
CPC .......... *H04W 24/10* (2013.01); *G01S 5/0236* (2013.01); *H04L 5/0007* (2013.01); *H04L 5/0048* (2013.01)

(58) Field of Classification Search
None
See application file for complete search history.

(56) References Cited

U.S. PATENT DOCUMENTS

2020/0351814 A1  11/2020 Manolakos et al.
2021/0368297 A1* 11/2021 Lin ...................... G01S 5/0236
(Continued)

OTHER PUBLICATIONS

Third Generation Partnership Project (3GPP), "Potential Techniques for NR Positioning", Samsung, 3GPP TSG RAN WG1 Meeting #95, Spokane, USA, Nov. 12-16, 2018, R1-1812972, 6 Pages.

*Primary Examiner* — Kenny S Lin
(74) *Attorney, Agent, or Firm* — Flaster Greenberg, P.C.

(57) ABSTRACT

A method for a Wireless Transmit/Receive Unit (WTRU). The method including receiving from a network configuration information indicating multiple frequency layers for positioning reference signals; and at least one activated frequency layer from among the multiple frequency layers. The frequency layers may be associated with one or more carriers for data transmission, wherein the carrier is co-located with its associated frequency layer for positioning; and bandwidth parts (BWPs) within carriers for data transmission. The WTRU may receive from the network activation/deactivation information indicating activation/deactivation of any of a secondary cell (SCell) and a BWP. The WTRU may transmit information indicating, for example, a set of frequency layers used for positioning, wherein the set of frequency layers is enabled according to any of an accuracy requirement, a latency, a measured RSRP of one frequency layer, and a measured CSI-RS corresponding to BWPs being a threshold.

14 Claims, 14 Drawing Sheets

Related U.S. Application Data

63/308,118, filed on Feb. 9, 2022, provisional application No. 63/257,330, filed on Oct. 19, 2021.

(56) References Cited

U.S. PATENT DOCUMENTS

| | | | |
|---|---|---|---|
| 2022/0007349 A1* | 1/2022 | Manolakos | H04L 27/261 |
| 2022/0045811 A1* | 2/2022 | Lin | H04L 5/0091 |
| 2023/0247671 A1* | 8/2023 | Manolakos | H04W 74/002 |
| | | | 370/329 |
| 2023/0261814 A1* | 8/2023 | Yerramalli | G01S 5/0205 |
| | | | 370/330 |
| 2023/0308240 A1* | 9/2023 | Cha | H04W 16/28 |
| 2023/0353308 A1* | 11/2023 | Duan | H04L 5/005 |
| 2023/0362699 A1* | 11/2023 | Yerramalli | H04W 24/10 |
| 2023/0379860 A1* | 11/2023 | Rao | G01S 5/01 |
| 2023/0393230 A1* | 12/2023 | Muruganathan | H04L 5/0051 |
| 2024/0259853 A1* | 8/2024 | El Hamss | G01S 5/0236 |

* cited by examiner

METHODS AND APPARATUS FOR ENABLING FREQUENCY LAYERS FOR POSITIONING

CROSS-REFERENCE TO RELATED APPLICATIONS

This application is a continuation of U.S. Non-Provisional Patent Application Ser. No. 18/633,178, filed Apr. 11, 2024, which is a continuation of International Application No. PCT/US2022/078095, filed Oct. 14, 2022, which claims the benefit of U.S. Provisional Patent Application No. 63,257, 330, filed Oct. 19, 2021; U.S. Provisional Patent Application No. 63,308, 118, filed Feb. 9, 2022; U.S. Provisional Patent Application No. 63,334,826, filed Apr. 26, 2022; and U.S. Provisional Patent Application No. 63,395,951, filed Aug. 8, 2022, the disclosure of which are incorporated herein by reference in their entirety.

FIELD OF THE INVENTION

This disclosure pertains to methods and apparatus of/for Wireless Transmit and/or Receive Units (WTRUs) in wireless communication systems.

BACKGROUND

The present disclosure relates to determining positions of wireless transmit receive units (WTRUs), and, for example, by using positioning reference signal (PRS) having or incorporating the concept of a frequency layer. For a PRS configuration, a frequency layer may be the highest or first level of configuration and transmit/receive points (TRPs) may be resource sets that are the lower or secondary level of configuration. In a case of a conventional wireless network, a conventional WTRU is configured to operate with up to four frequency layers. However, such conventional WTRU may only process one frequency during a measurement performed for determining the position of the WTRU, while different positioning methods may be used on respective frequency layers.

SUMMARY

According to embodiments, a WTRU may be configured with multiple frequency layers. One or more (or each) frequency layer may be associated with one or more carriers, cells and/or bandwidth parts for data transmission. A WTRU may be triggered to enable one or more frequency layers for positioning. The triggering to enable a frequency layer for positioning may include various combinations of detected triggers.

An example of a trigger to enable a frequency layer for positioning may include the configured secondary cells (SCells) activation/deactivation status associated with the frequency layer. An example trigger to enable a frequency layer for positioning may include a given bandwidth part associated with the frequency layer being activated. In embodiments, a trigger to enable a frequency layer for positioning may include one or more requirements of the positioning services being satisfied for a frequency layer. In embodiments, the trigger may include a measurement quality of a positioning reference signals (PRS), for example when the quality is above a set threshold. The WTRU may utilize a combination of triggers to enable a given frequency layer for positioning.

According to embodiments, a WTRU may be configured to receive configuration information from a network indicating a plurality of frequency layers for positioning measurements. At least one frequency layer may be associated with a first cell or a first configured bandwidth part (BWP) and at least a second frequency layer being associated with a second BWP or a second cell. The WTRU may activate the second cell, wherein the second BWP is active in the second cell. The WTRU may further perform a first measurement associated with one or more positioning PRS transmissions in the first frequency layer associated with the first cell or the first BWP. The WTRU may perform a second measurement associated with one or more PRS transmissions in the second frequency layer associated with the second cell or the second BWP based on the first measurement associated with the PRS transmissions in the first frequency layer being below a threshold. The WTRU may further send a measurement report comprising at least one of the first or second measurement and an indication of the frequency layer(s) associated with the measurement(s).

According to embodiments, a WTRU may be configured to utilize a plurality of measurement gaps (MGs). Each measurement gap may be associated with a set of one or more frequency layers. A MG duration or length may depend on (e.g., be associated with) one or more of a total bandwidth of the enabled frequency layer(s), a numerology of the enabled frequency layer(s), the number of enabled frequency layer(s), and/or the like. According to embodiments, a WTRU may request a MG from the pre-configured MGs based on the enabled set of frequency layers. The duration of the MG requested by the WTRU may depend on one or more within the total bandwidths of the enabled frequency layer(s), a numerology of the enabled frequency layer(s), the number of enabled frequency layer(s), and/or the like.

According to embodiments, a WTRU may be configured to request one or more MG(s) that is/are associated with a set of aggregated frequency layers. The WTRU may be configured to activate and/or deactivate frequency layer aggregation. According to embodiments, in a case where the WTRU is configured to request MG(s) associated with aggregated frequency layers, the WTRU may activate or deactivate the frequency layer aggregation based on various conditions. According to embodiments, in the case where the WTRU may activate or deactivate the frequency layer aggregation, the activation or deactivation may be based on the acquisition of a channel in an unlicensed spectrum.

According to embodiments, the WTRU may determine parameters for hop-based measurements based on the priority level of PRS and channel conditions, such as Doppler shift. For example, the WTRU receives PRS configuration from the network and a configuration related to a prioritization window (e.g., priority level of PRS). An association rule between measurement parameters (e.g., number of repetitions) and channel condition from location management function (LMF) may further be provided, along with Doppler shift information of the channel. If the priority level of PRS is high, the WTRU may then determine a measurement pattern and whether to enable hop-based measurements. Upon enabling hop-based measurements, the WTRU determines hop parameters based on the Doppler shift information and association rule (e.g., the number of repetitions in measurements based on Doppler shift). If the priority level of PRS is low, the hop-based measurement is disabled and the WTRU makes measurements for the default bandwidth. Thereafter, the WTRU receives PRS and makes measurements (e.g., RSRP, RSTD) according to the hop measurement pattern.

In embodiments, the WTRU may be configured to maintain measuring/monitoring PRSs within a disabled frequency layer until a timer expires. The WTRU may select a positioning method calculation per frequency layer based on the frequency band of the enabled frequency layer, the bandwidth of the enabled frequency layer and/or the expected time of disabling a frequency layer.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Figure 1A:
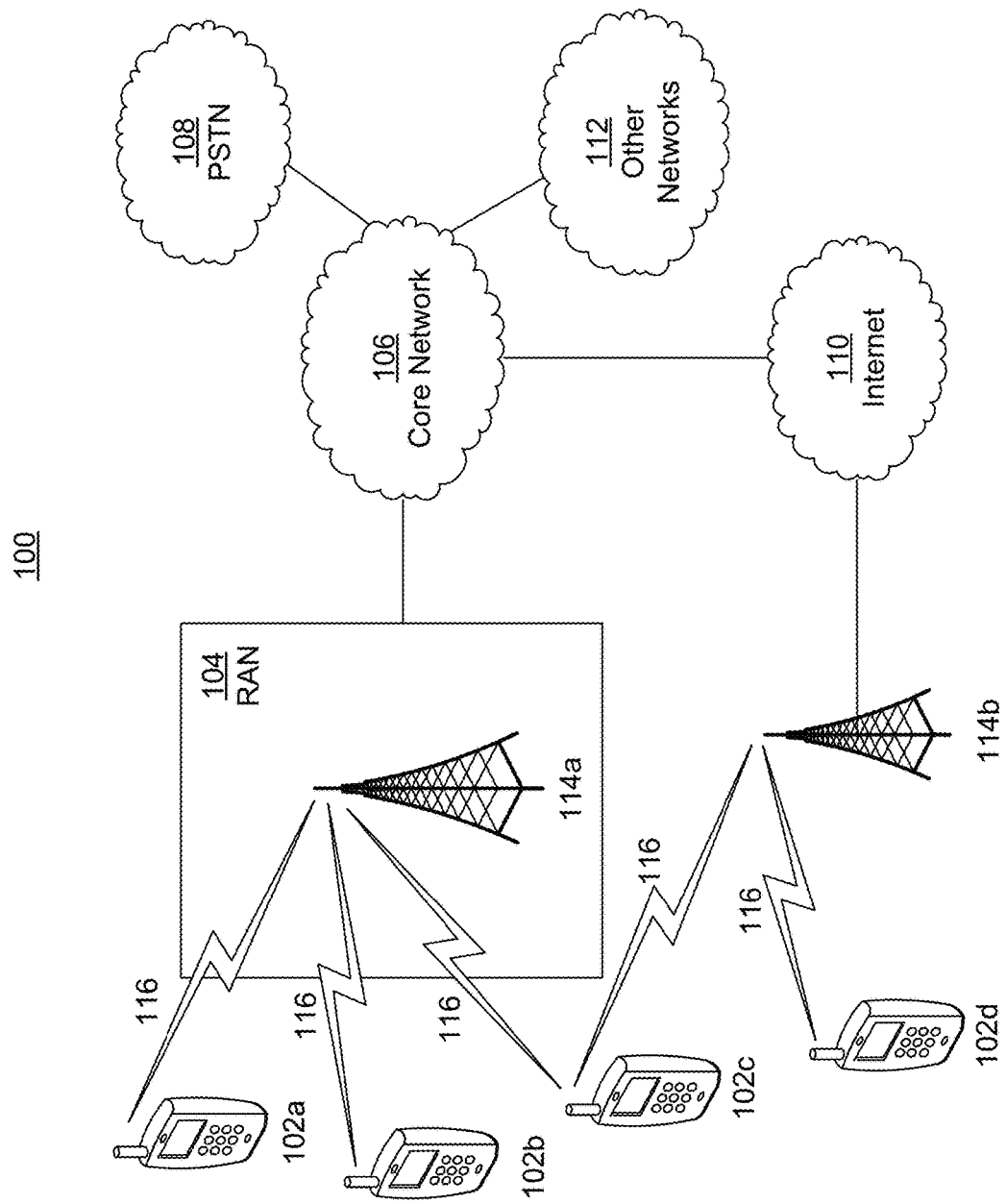
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114b, which may employ an IEEE 802 radio technology.

Figure 1B:
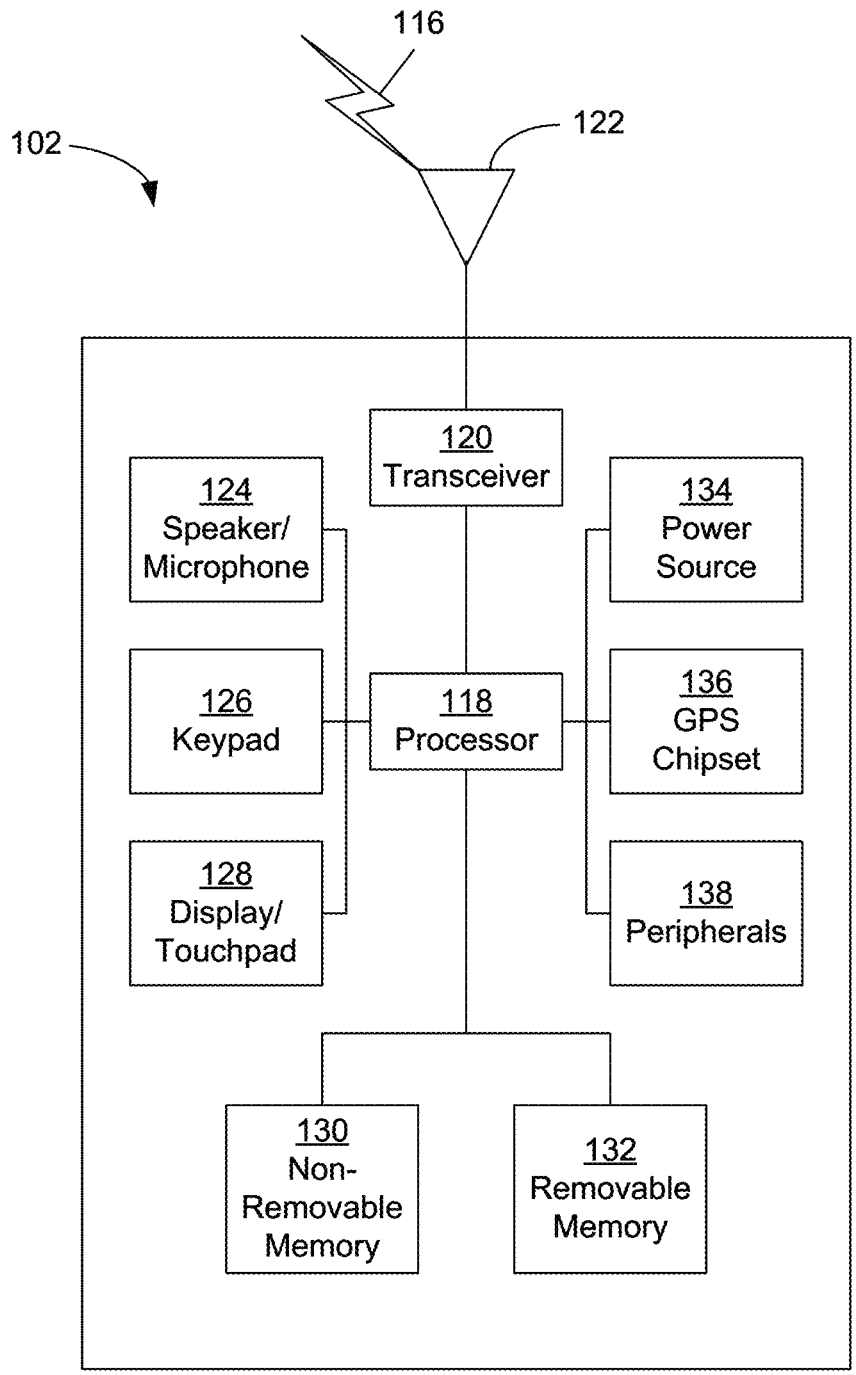
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
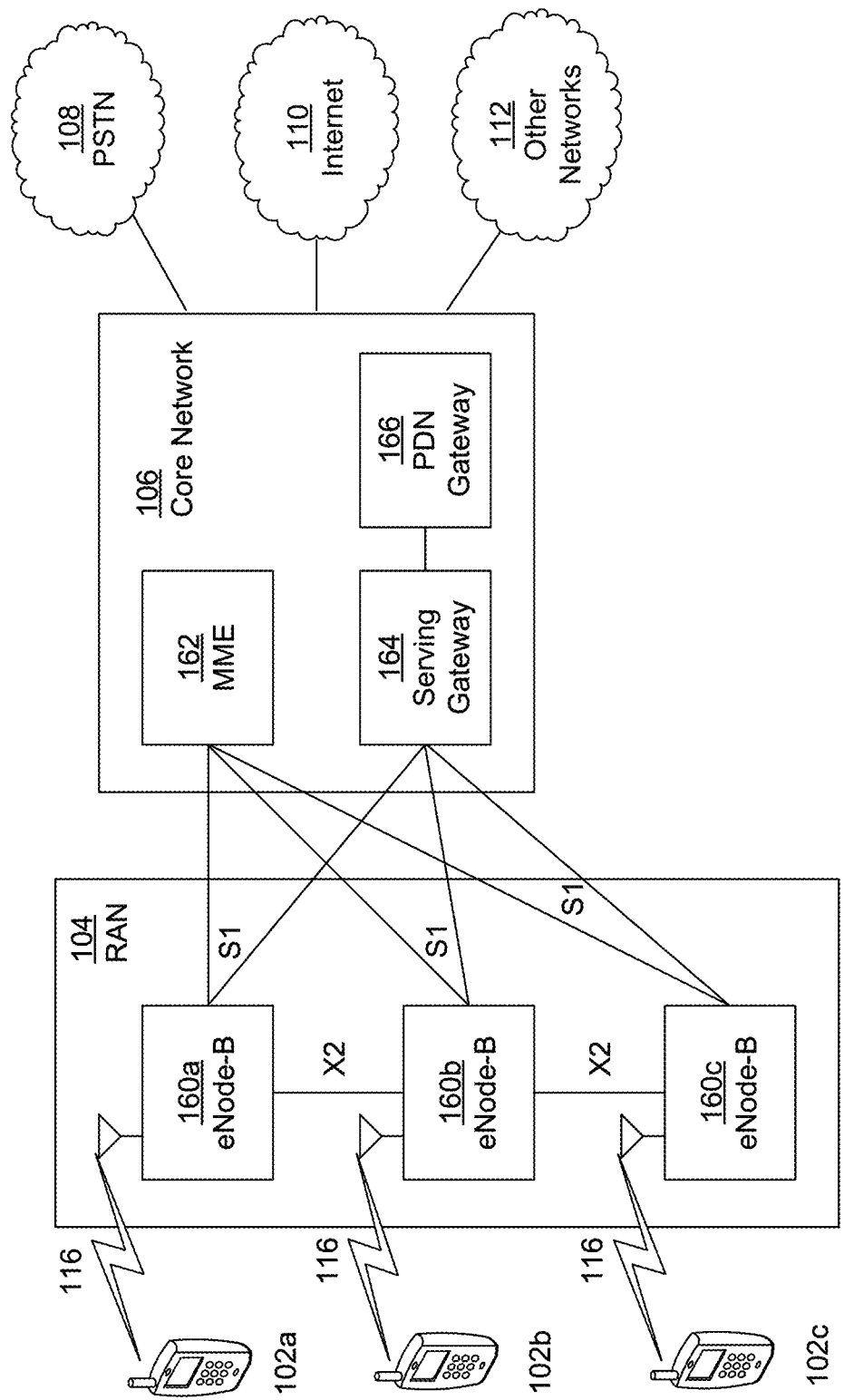
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHZ to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
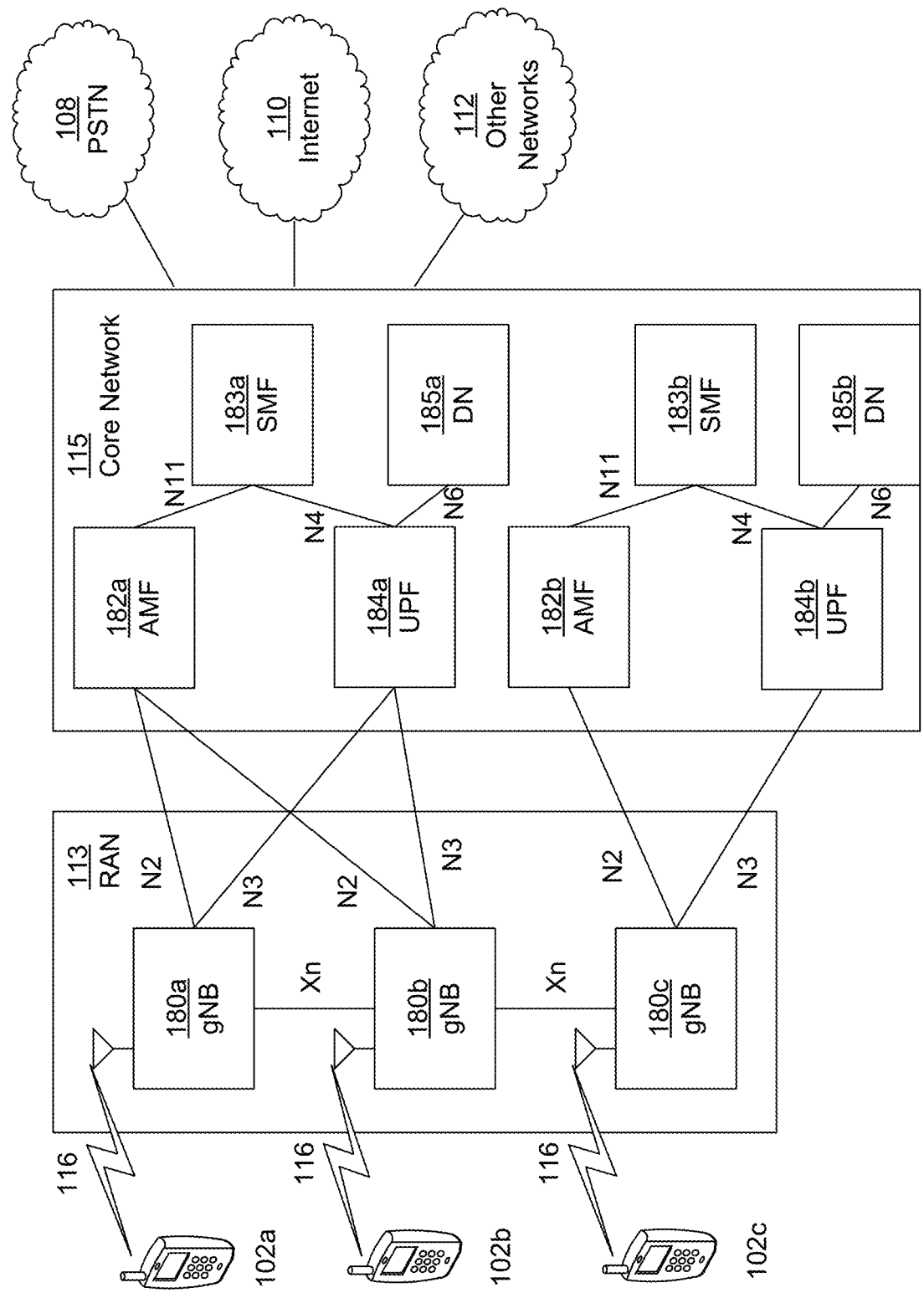
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (CCs) to the WTRU 102a (not shown). A subset of these CCs may be on unlicensed spectrum while the remaining CCs may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-Third Generation Partnership Project (3GPP) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A frequency layer may be considered to be a concept and/or aspect of wireless and/or radio frequency (RF) communications used for positioning reference signals (PRSs). A frequency layer may consist of (e.g., may be defined, referenced, configured, indicated, characterized, parameterized by, and/or may include, have, etc.) any of a bandwidth, a center frequency, and a (e.g., corresponding) numerology. For example, a WTRU may be configured with a frequency layer consisting of (e.g., defined/referenced by) a bandwidth, center frequency and the corresponding numerology. A frequency layer may be considered as (e.g., may include) wireless network/communication resources, for example, that are configured and/or allocated with respect to wireless communications between wireless devices.

Figure 2:
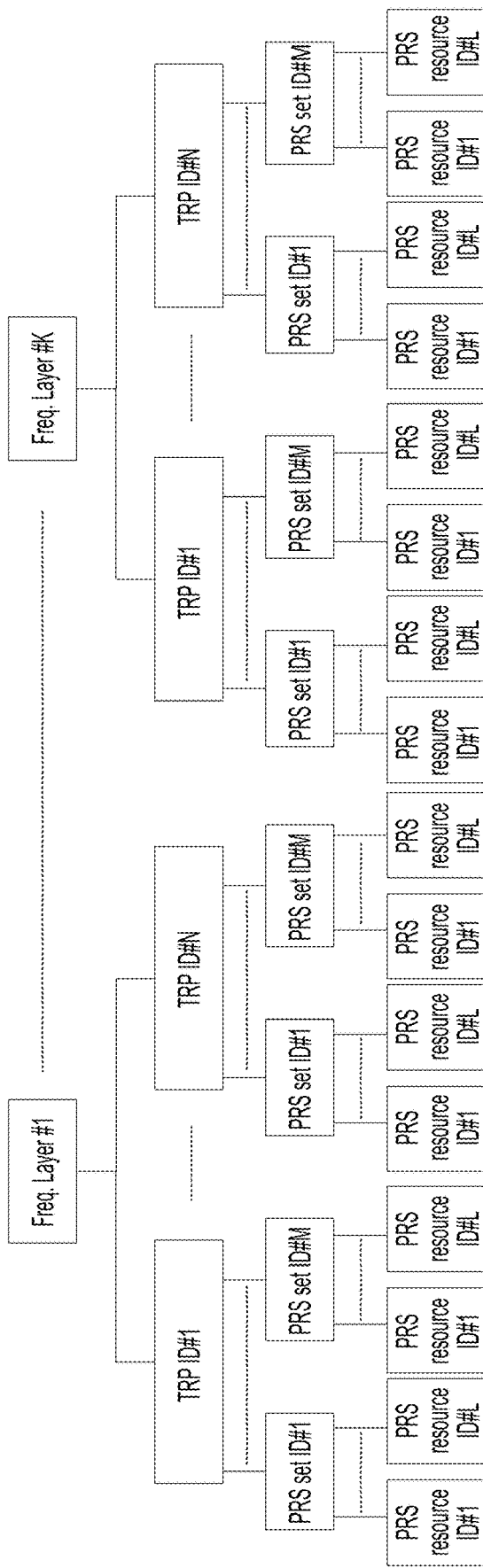
FIG. 2 is a diagram illustrating a resource configuration including frequency layers.

FIG. 2 is a diagram illustrating a resource configuration including frequency layers. Within FIG. 2, any number of transmit/receive points (TRPs) may be associated with a frequency layer, and any number of sets of PRSs (e.g., PRS configurations) may be associated with a TRP. In a case of a conventional wireless (e.g., 3GPP specified) positioning system, a conventional WTRU that is configured with up to 4 frequency layers only process one frequency during the measurement (e.g., for the positioning). Further, in such case, different frequency layers may be used by the conventional WTRU for different positioning methods. For example, positioning using a Reference Signal Time Difference (RSTD) method can be based on a first frequency layer, while positioning using a Round Trip Time (RTT) method can be based on a second frequency layer.

A downlink (DL) positioning method may be (e.g., refer to) any positioning method that uses DL reference signals, such as PRSs. In such DL positioning method, the WTRU receives multiple reference signals from one or more transmission points (TPs) and performs DL measurements, such as any of RSTD, Reference Signal Receive Power (RSRP), etc. Examples of DL positioning methods are DL-Angle of Departure (DL-AoD) or DL-Time Difference of Arrival (DL-TDOA) positioning. An uplink (UL) positioning method may be (e.g., refer to) any positioning method that uses UL reference signals, such as a sounding reference signal (SRS) for positioning. In such UL positioning method, a WTRU transmits SRSs to multiple receive points (RPs) and the RPs measure the UL-Relative Time of Arrival (UL-RTOA) and/or RSRP. Examples of UL positioning methods are UL-Time Difference of Arrival (UL-TDOA) or UL-Angle of Arrival (UL-AoA) positioning.

A combined DL and UL positioning method may be (e.g., refer to) any positioning method that uses both UL and DL reference signals for positioning. For example, in a case of the combined DL and UL positioning method, the method uses a Rx-Tx time difference (e.g., based on UL and DL signaling), which may refer to (e.g., may include determining) a difference between an arrival time of a reference signal (e.g., PRS) transmitted by a TRP (e.g., a gNB) and a transmission time of a reference signal (e.g., a SRS) transmitted by the WTRU. In the case of the combined DL and UL positioning method, a WTRU transmits SRSs to multiple TRPs (e.g., gNBs) that measure Rx-Tx time differences, and a TRP measures RSRP for the received SRSs. In such case, the WTRU measures an Rx-Tx time difference for a PRS transmitted from multiple TRPs, and the WTRU measures RSRP for the received PRS. Further in such case, the receiver-transmitter (RX-TX) difference and (e.g., possibly the) RSRP measured at WTRU and TRP are used to compute round trip time. An example of DL & UL positioning method is multi-round trip time (RTT) positioning.

Conventional positioning systems/methods, such as the DL, UL, and combined DL and UL positioning methods discussed above, have shortcomings as per providing high accuracy positioning, for example, with respect to potential/future use cases of wireless networks. For example, use cases such as factory deployments and vehicle communications have a need for high accuracy for positioning services. The accuracy of an estimated position depends on a bandwidth used for PRSs, because an estimation error decreases when the bandwidth used for PRSs increases. With limited bandwidth configuration available for positioning, an achievable accuracy will be limited. Although in the conventional positioning systems/methods, the WTRU can be configured with up to 4 frequency layers (i.e., one frequency per cell) the frequency layer cannot be dynamically switched due to the WTRUs conventional (e.g., 3GPP LTE Positioning Protocol (LPP)) configuration. Furthermore, the conventional use of frequency layers does not allow them to be aggregated, preventing wideband positioning. In view of the above shortcomings of conventional positioning methods, there is a need (e.g., for a WTRU, TRP, eNB, etc.) to flexibly combine and/or switch frequency layers, for example, depending on measurement conditions.

According to embodiments, a positioning method used by a wireless network may include and/or use an accuracy requirement, such as, for example, and accuracy requirement associated with a positioning measurement performed by a WTRU. According to embodiments, an accuracy requirement may include (e.g., consist, have, use, be associated with, indicate, etc.) any of a horizontal accuracy of the position, a vertical accuracy of the position, and both the horizontal and the vertical accuracy of the position. According to embodiments, a PRS configuration, for example, for a WTRU, may include an accuracy requirement. That is, according to embodiments, a WTRU may be configured with an association between accuracy requirement for a positioning, and with a bandwidth size of a positioning reference signal (PRS). For example, there may be a case where a horizontal accuracy of 2 meters may be associated with a PRS bandwidth larger than 100 MHz. According to embodiments, any number of (e.g., multiple) accuracy requirements may be associated with respective (e.g., different) bandwidth sizes. According to embodiments, a WTRU may be semi-statically configured with such an association, for example, by/from a gNB or a location management function (LMF).

According to embodiments, (e.g., as an alternative to semi-static configuration) the association between an accuracy requirement and a bandwidth size may be static, that is, it may be fixed (e.g., defined, specified, explicated, etc.) in a specification. According to embodiments, a WTRU may be configured with an association between a (e.g., required) latency for positioning and bandwidth size of PRSs. For example, a latency of 40 ms may be associated with a PRS bandwidth larger than 200 MHz. According to embodiments, multiple (e.g., any number of) latency requirements may be associated with any number of (e.g., different) bandwidth sizes. According to embodiments, any of a gNB or an LMF may semi-statically configure a WTRU with such association. According to embodiments, (e.g., as an alternative to semi-static configurations), an association between latency and bandwidth size may be fixed (e.g., in a specification). According to embodiments, as discussed hereinbelow, it may be assumed that a WTRU may be configured with (e.g., information indicating an, a formula for, etc.) association between bandwidth size and any of accuracy requirement and latency requirement of the positioning service.

According to embodiments, a WTRU may support multiple (e.g., enabled) frequency layers. According to embodiments, a WTRU may be configured to support multiple (e.g., enabled) frequency layers. According to embodiments, a WTRU may determine whether (e.g., if) it may support multiple (e.g., enabled) frequency layers for positioning, for example, based on an (e.g., according to the WTRUs) ability/capability of supporting carrier aggregation for data transmission. For example, according to embodiments, in a case where a WTRU determines that it may support multiple (e.g., enabled) frequency layers, the WTRU may (e.g., then) report to the LMF the capability of supporting multiple (e.g., enabled) frequency layers for positioning. According to embodiments, an LMF may be a non-limiting example of a node and/or an entity (e.g., a network node or entity) that may be used for supporting positioning. According to embodiments, the disclosure herein is not limited to using an LMF, and any other suitable and/or similar node or entity may be substituted for the LMF and still be consistent with this disclosure.

According to embodiments, a WTRU may be configured to report, for example, to the LMF, a set of configured secondary cells (SCells) and/or CCs (e.g., that were configured by a gNB) for data transmission. For example, according to embodiments, a WTRU may be configured to use LPP signaling to report, to the LMF, the configured SCell/CCs. Further, the WTRU may report, to the LMF, any of a cell ID, an absolute radio-frequency channel number (ARFCN), and a bandwidth of each of the configured SCell/CC for data transmission.

According to embodiments, a WTRU may be configured to report, to the LMF, the active SCell/CCs, for example, upon receiving an indication, such as, for example, an activating or deactivating indication, from a gNB. For example, in a case where the WTRU receives a MAC control element (MAC-CE) deactivating one or more SCell/CCs, the WTRU reports, to the LMF, using the LPP protocol, the set of active SCell/CCs. According to embodiments, in a case where a WTRU receives a MAC-CE activating one or more SCell/CCs, the WTRU reports, to the LMF using the LPP protocol, the set of active SCell/CCs. According to embodiments, a WTRU may be configured to report, to the LMF, the set of configured bandwidth parts (BWPs) within a CC. For example, according to embodiments, the WTRU may report, to the LMF, any of BWP ID(s) and bandwidths of configured BWPs, and the WTRU may indicate the CC of each BWP when reporting the set.

According to embodiments, a WTRU may be configured, for example, by a network (e.g., LMF, gNB, etc.), with multiple frequency layers for positioning reference signals. According to embodiments, a WTRU may be configured (e.g., initially, preliminarily, preconfigured, etc.) to enable (e.g., activate) one or more frequency layers. According to embodiments, a WTRU may be configured to associate a frequency layer with one or more of any of: SCells, CCs, and BWPs, for data transmission. According to embodiments, a WTRU may be configured, for example, (e.g., explicitly) by the LMF and/or the gNB, to associate a frequency layer with one or more SCells, CCs, and/or BWPs. For example, according to embodiments, a WTRU may receive, from a LMF, (e.g., information, such as configuration information, indicating) a mapping that associates a frequency layer to one or more cell IDs. According to embodiments, a WTRU may receive, from the gNB, (e.g., information indicating) a mapping that associates frequency layers and BWP with a cell.

According to embodiments, a WTRU may autonomously associate a frequency layer with any of a SCell, a CC, and a BWP. According to embodiments, a WTRU may be configured to autonomously associate a frequency layer with a SCell, CC, and/or BWP, for example, in a case where a frequency layer and any of a SCell, a CC, and a BWP are collocated in frequency domain. For example, according to embodiments, in a case where any of a SCell, a CC, and a BWP below to a same frequency band, a WTRU may associate a frequency layer with any of the SCell, the CC, and the BWP. According to embodiments, for example, in a case where a frequency offset between a center frequency of a frequency layer and a center frequency of a SCell, a CC, and a BWP exceeds (e.g., is below or above) a (e.g., configured) threshold, a WTRU may associate a frequency layer with any of the SCell, the CC, and the BWP. According to embodiments, a WTRU may associate a frequency layer with any of a SCell, a CC, and a BWP, for example, in a case where a bandwidth of a frequency layer is within a bandwidth of any of the SCell, the CC, and/or the BWP. According to embodiments, a WTRU may associate a frequency layer with any of a SCell, a CC, and a BWP, for example, in a case where the WTRU is capable of simultaneously supporting any of the SCell, the CC, and the BWP, and the frequency layer. According to embodiments, such capability may be defined and/or specified.

Figure 3:
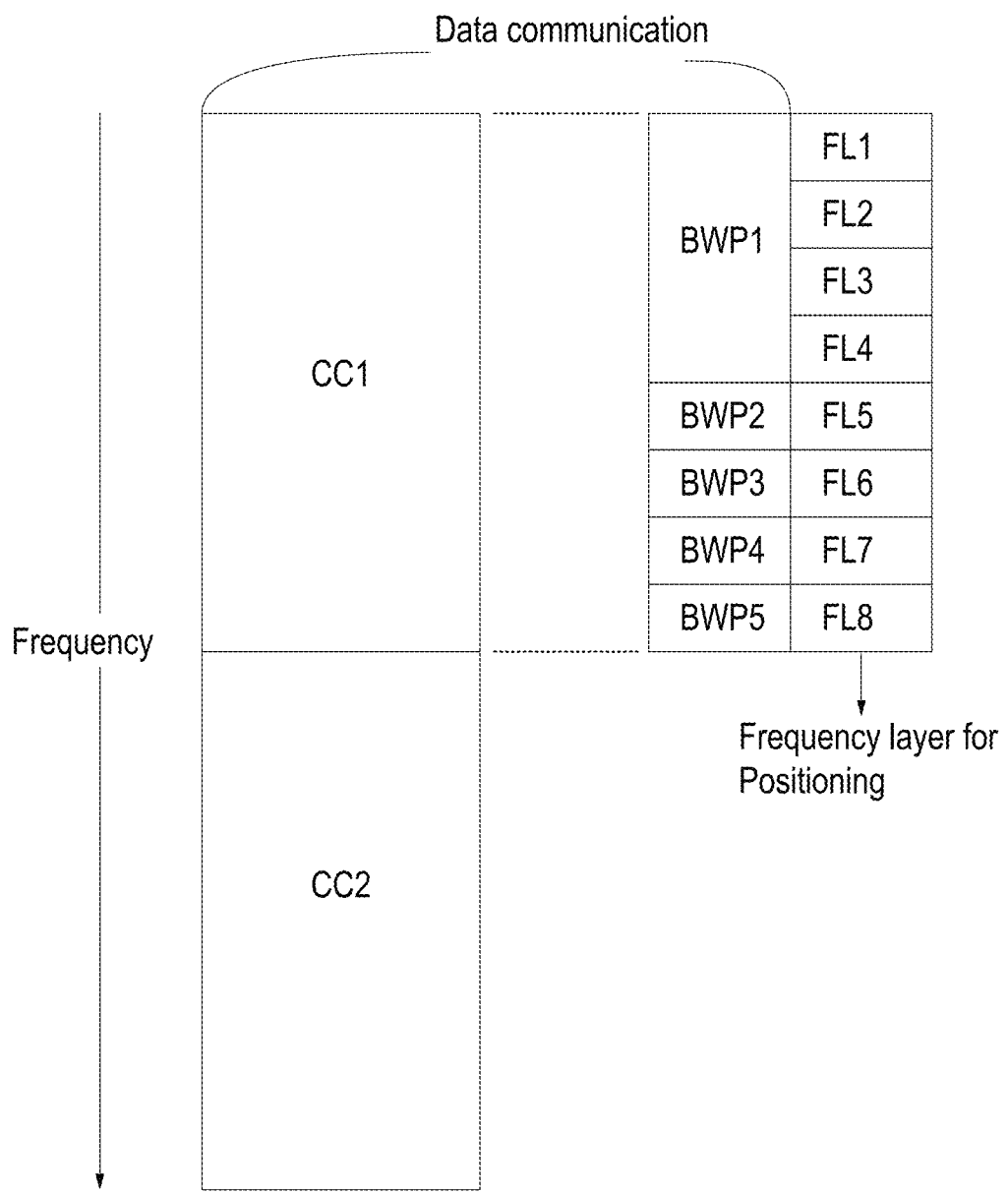
FIG. 3 is a diagram illustrating an association between a CC, a BWP, and frequency layer, according to embodiments.

FIG. 3 is a diagram illustrating an association between a CC, a BWP, and frequency layer, according to embodiments. According to embodiments, a WTRU may associate any of a single SCell, a CC, and a BWP with any number of frequency layers. That is, according to embodiments, a WTRU may be configured to associate (e.g., configured with information for associating) any of a single SCell, a single CC, and a single BWP, with multiple frequency layers. For example, according to embodiments, there may be a case where a wideband BWP may be associated with multiple frequency layers, and a narrowband BWP may be associated with a single frequency layer (e.g., that is different than any of or the same as one of the multiple frequency layers). Referring to FIG. 3, a first CC, CC1, for data transmission may be associated with 8 frequency layers, including FL1 through FL8, for positioning (e.g., for positioning signaling). According to embodiments, referring to FIG. 3, a first BWP, BWP1, may be associated with 4 frequency layers FL1 through FL4. According to embodiments, a WTRU may be configured to associate a single frequency layer with any of multiple SCells, multiple CCs, and multiple BWPs.

According to embodiments, a PRS configuration (e.g., bandwidth of PRS, number of OFDM symbols, repetition factor, comb factor, etc.) may be associated with multiple frequency layers. The WTRU may receive a list of PRS configurations from the network (e.g., LMF, gNB), associating one or more (or each) PRS configuration with multiple frequency layers. For example, according to the list the WTRU may determine that PRS configuration A is associated with frequency layer #1 and #2 while PRS configuration B is associated with frequency layer #3 and #4. When the WTRU receives an indication that multiple frequency layers are configured, the WTRU may determine PRS configuration according to the list. In this example, "frequency layer" may be used interchangeably with SCell, CC or BWP.

According to embodiments, a base station (e.g., gNB) may transmit any of an activation command and a deactivation command associated with any of a SCell, a CC, and a BWP. That is, according to embodiments, a WTRU may receive (e.g., from a gNB) an activation command and/or a deactivation command for one or more of the configured SCells, CCs, and/or BWPs. According to embodiments, in a case where any of a SCell, a CC, and a BWP, corresponding to a frequency layer, is activated, then a WTRU may enable the frequency layer for positioning. For example, according to embodiments, referring to FIG. 3, in a case where CC1 is activated, a WTRU may enable any of frequency layers FL1 through FL8 for positioning. According to embodiments, referring to FIG. 3, in a case where BWP5 is activated, a WTRU may enable FL8 frequency layer for positioning. According to embodiments, a WTRU may disable a frequency layer for positioning, for example, in a case where a corresponding SCell, CC, and/or BWP, is deactivated.

According to embodiments, a WTRU may determine which frequency layer(s) to enable, for example, according to a subcarrier spacing of any of active SCells, active CCs, and active BWPs. For example, a WTRU may enable a frequency layer with a subcarrier spacing equal to the subcarrier spacing of at least one of the active SCells, the active CCs, and the active BWPs. According to embodiments, an accuracy requirement may be used by the WTRU to determine any number of frequency layers to enable from the any of the active SCells, the active CCs, and the active BWPs. For example, according to embodiments, a WTRU may use a configured association between accuracy (e.g., accuracy requirements) and bandwidth size to determine a (e.g., required) bandwidth for PRSs.

According to embodiments, a WTRU may receive (e.g., information indicating) an association between accuracy and bandwidth size from a network (e.g., gNB, LMF). According to embodiments, based on a set of active SCells, active CCs, and/or active BWPs, a WTRU may determine a set of frequency layers, for example, that are available for activation using the association between any of the SCells, the CCs, the BWPs and frequency layers. According to embodiments, a WTRU may (e.g., then) enable a frequency layer having (e.g., associated with) a bandwidth greater than or equal to a (e.g., determined, required, etc.) bandwidth that is used (e.g., necessary, needed, etc.) to meet an accuracy requirement. According to embodiments, (e.g., as an alternative) a WTRU may enable multiple frequency layers and may aggregate (e.g., operation of, use of, etc.) the frequency layers, for example, to meet an accuracy requirement.

According to embodiments, for example, based on (e.g., according to) a required latency, a WTRU may determine the frequency layers to enable from (e.g., from among, belonging to, etc.) any of the active SCells, the active CCs, and the active BWPs. That is, according to embodiments, a WTRU may use a configured association between a required latency and a bandwidth size, for example, to determine the (e.g., needed, minimum, required, etc.) bandwidth for PRSs. According to embodiments, based on a set of any of active SCells, active CCs, and active BWPs, a WTRU may determine a set of frequency layers available for activation, for example, by using (e.g., based on, according to, etc.) an association between any of SCells, CCs, and BWPs, and frequency layers. According to embodiments, a WTRU may (e.g., then) enable a frequency layer with a bandwidth greater than or equal to the required bandwidth determined to meet a latency requirement. According to embodiments, (e.g., as an alternative to enabling one frequency layer) a WTRU may enable multiple frequency layers and may aggregate the frequency layers to meet the latency requirement.

According to embodiments, a WTRU may determine whether a measured RSRP of one or more PRS within a frequency layer is below a threshold. In a case where the measured RSRP of one or more PRS within a frequency layer is below the threshold, according to embodiments, the WTRU may determine the frequency layers to enable from (e.g., among) any of the active SCells, the active CCs, and the active BWPs. For example, according to embodiments, a WTRU may be configured with a first enabled frequency layer to measure PRS(s). According to embodiments, a WTRU may determine that a (e.g., measured) RSRP of at least one PRS within an enabled frequency layer is below a (e.g., configured) threshold. According to embodiments, a WTRU may determine that a (e.g., measured) RSRP of N PRSs within an enabled frequency layer is below a (e.g., configured) threshold, where N is a configured number of PRS.

According to embodiments, in a case where a measured RSRP of PRS(s) is below a configured threshold, the WTRU select a (e.g., another, second, different, etc.) frequency layer, for example, to enable such selected frequency layer from among the frequency layers associated with any of the active SCells, active CCs, and active BWPs. According to embodiments, a WTRU may select to enable a frequency layer associated with (e.g., having) the larger bandwidth. According to embodiments, (e.g., as an alternative) the WTRU may activate all frequency layers associated with all of the active SCells, the active CCs, and the active BWPs. According to embodiments, a WTRU may enable and/or disable any frequency layer. For example, a WTRU may disable an already enable first frequency layer after enabling a second frequency layer.

According to embodiments, a WTRU may perform a measurement associated with a Channel-State Information Reference Signal (CSI-RS) corresponding to any of a SCell, a CC, and a BWP. According to embodiments, in a case where a measured CSI-RS corresponding to SCell/CC/BWP below a threshold, a WTRU may determine (e.g., select) the frequency layers to enable from among any of the active SCells, the active CCs, and the active BWPs. There may be a case where, according to embodiments, a WTRU is configured with (e.g., information indicating, configured to use, etc.) a first enabled frequency layer to measure PRS(s), wherein the first enabled frequency layer is associated with an active SCell, CC, and/or BWP for data transmission. According to embodiments, in such a case, a WTRU may determine that the measured CSI-RS on a SCell (e.g., and/or any of a CC and a BWP) associated with the first enabled frequency layer is below a configured threshold. Further, in such a case, the WTRU may select (e.g., determine) to enable a second frequency layer that is the associated frequency layers with the remaining active SCells (e.g., CCs, BWPs). According to embodiments, in such a case, a WTRU may disable the first enabled frequency layer after enabling the second frequency layer.

According to embodiments, a WTRU may be configured with multiple PRS configurations where each PRS resource may be associated with SCell, CC, BWP, or frequency layer. The WTRU may receive an indication from the network to activate multiple SCells, CCs, BWPs, or frequency layers, if PRS resources associated with multiple SCells, CCs, BWPs or frequency layers have the similar error characteristics (e.g., phase error, timing error). For example if PRS resources belong to the same timing error group, the WTRU may determine that the PRS resources share similar timing error. Thus, the WTRU may determine that multiple SCells, CCs, BWPs or frequency layers are activated simultaneously if the PRS resources belong to the error group (e.g., timing error group, phase error group).

According to embodiments, a WTRU may receive information indicating (e.g., commanding, instructing, configuring, etc.) the WTRU to select frequency layers according to a RSRP measured for a CSI-RS and/or a PRS. For example, according to embodiments, a WTRU may receive an indication, from a network (e.g., gNB, LMF) via any of downlink control element (DCI), MAC control element (MAC-CE), radio resource control (RRC), and LPP messaging/signaling, to select frequency layers based on RSRP measured on CSI-RS and/or PRS. According to embodiments, a WTRU may receive (e.g., may be configured with information indicating) different thresholds for selection of frequency layers based on CSI-RS RSRP and/or PRS RSRP. According to embodiments, a WTRU may be configured to use both RSRP thresholds. That is, the WTRU may determine to use the frequency layer in a case where both CSI-RS RSRP and PRS RSRP are above their respective thresholds. According to embodiments, a WTRU may be configured to receive an indication from the network (e.g., LMF and/or gNB) to enable one or multiple frequency layers. According to embodiments, a WTRU may receive a LPP message enabling one or more frequency layers.

According to embodiments, a WTRU may receive a DCI (e.g., and/or any of a MAC-CE message and an RRC message) enabling one or more frequency layers. For example, according to embodiments, an LMF may send, to a gNB, an indication regarding (e.g., information indicating, configuring, commanding, etc.) frequency layers that the WTRU is (e.g., instructed, commanded, configured) to enable. In such a case, according to embodiments, a gNB may relay the information to the WTRU using lower layer signaling, such as DCI or MAC-CE signaling, and the WTRU may activate the SCell, CC, BWP corresponding to the enabled frequency layer. For example, according to embodiments, there may be a case where a WTRU is configured with a frequency layer x associated with a BWP y. In such a case, according to embodiments, in a further case of receiving an enabling indication (e.g., information indicating frequency layer enablement), from the LMF, for the frequency layer x, the WTRU may switch to BWP y for data transmission.

According to embodiments, there may be a case where a WTRU is configured with a frequency layer x associated with a SCell y. In such a case, a WTRU may receive the enabling indication, from the LMF, for the frequency layer x, and the WTRU may enable the SCell y for data transmission. According to embodiments, a WTRU may enable frequency layers according to a positioning method performed/used by the WTRU. According to embodiments, a WTRU may be configured with restrictions that are associated with (e.g., certain) positioning methods. For example, a WTRU may be configured with positioning method-dependent restrictions on combination of frequency layers. That is, according to embodiments, for Angle of Departure (AoD) positioning method, a WTRU may enable frequency layers with different numerologies, and for Time Difference of Arrival (TDOA) positioning method, the WTRU may not (e.g., cannot, is not allowed to, etc.) aggregate frequency layers with different numerologies.

According to embodiments, there may be a case where a WTRU is configured with TDOA where the WTRU may not aggregate SCells, CCs, BWPs or frequency layers where PRS resources associated with SCells, CCs, BWPs or frequency layers do not belong to the same error group (e.g., timing error group, phase error group).

According to embodiments, a WTRU may receive the number of SCells, CCs, BWPs or frequency layers, N, to activate from the network (e.g., LMF, gNB). The WTRU may receive criteria based on which the WTRU determines SCells, CCs, BWPs, or frequency layers to activate. The WTRU may determine to activate SCells, CCs, BWPs, or frequency layers where the number of activated SCells, CCs, BWPs or frequency layers may be less than N. According to embodiments, the WTRU may determine not to activate any SCells, CCs, BWPs, or frequency layers if the number of SCells, CCs, BWPs or frequency layers that can be activated is less than N.

According to embodiments, the WTRU may determine to disable/deactivate aggregation of SCells, CCs, BWPs, or frequency layers if one or more conditions are not satisfied. For example, the WTRU may disable aggregation of SCells, CCs, BWPs, or frequency layers if the number of aggregated SCells, CCs, BWPs or frequency layers is not the same across configured PRS resources, PRS resource sets, or TRPs from which PRS(s) are transmitted from. Once the WTRU determines to disable aggregation of frequency layers, the WTRU may determine to use the default SCells, CCs, BWPs or frequency layers that was used prior to enabling aggregation of SCells, CCs, BWPs, or frequency layers.

According to embodiments, the WTRU may enable a frequency layer based on the channel access procedure outcome (listen before talk outcome). The WTRU may be configured with one or more frequency layers with frequency resources belonging to unlicensed spectrum. According to embodiments, the WTRU may first attempt to access the channel where a frequency layer is configured and upon successfully acquiring the channel, the WTRU enables the frequency layer. According to embodiments, the WTRU may receive an indication from the gNB indicating that a channel is acquired by the gNB. The WTRU may then enable the frequency layer that has frequency resources within the acquired channel indicated from the gNB. The WTRU may also receive a DCI (WTRU-specific or group common DCI) indicating which frequency resources are acquired by the gNB and the channel occupancy time. The WTRU may enable a frequency layer belonging to unlicensed spectrum only during the duration where the channel is acquired i.e., channel occupancy time. Upon releasing the channel (either by the gNB or the WTRU), the WTRU may disable the corresponding frequency layer.

According to embodiments, a WTRU may be configured to report a set of enabled frequency layers, for example, to a network (e.g., LMF and/or gNB). According to embodiments, a WTRU may report the set of selected (with the enabled) frequency layers before reporting the measurement results. According to embodiments, (e.g., as an alternative) the WTRU may report the set of enabled frequency layers along with the measurement results of PRS. According to embodiments, there may be a case where a WTRU reports, to the network, preferred frequency layers, for example, without enabling the frequency layers (e.g., by itself). In such a case, the WTRU (e.g., then) waits for the network (e.g., LMF and/or gNB) configuration for frequency layers to enable one or more frequency layers. According to embodiments, a WTRU may select a set of frequency layers, for example, to report to the network, using the triggers to enable a frequency layer.

According to embodiments, the WTRU may not report the network (e.g., LMF, gNB) the set of enabled SCells, CCs, BWPs, or frequency layers. The WTRU may receive an indication from the network to enable aggregation of SCells, CCs, BWPs, or frequency layers. In addition, the WTRU may receive association with the SCells, CCs, BWPs, or frequency layers and PRS configurations from the network. Each SCells, CCs, BWPs or frequency layers may be associated with an ID. For example, each BWP may be associated with PRS configuration (e.g., bandwidth, comb-pattern, repetition factor, number of symbols for PRS) and the WTRU may determine PRS configuration(s) associated with the activated BWP(s) where the BWP(s) are activated based on at least one of the aforementioned conditions. The network may determine which SCells, CCs, BWPs, or frequency layers to activate based on measurement reports from the WTRU. PRS configurations may be associated with multiple SCells, CCs, BWPs, or frequency layers. Each combination of SCells, CCs, BWPs or frequency layers may be associated with an ID (e.g., a group of SCells, CCs, BWPs or frequency layers may be associated with an ID) and the ID may be associated with a PRS configuration. Depending on the ID of the group of activated SCells, CCs, BWPs, or frequency layers, the WTRU may determine the PRS configuration.

According to embodiments, a WTRU may report (e.g., transmit information indicating) an identifier (ID) of any of a preferred BWP and a preferred SCell, and the WTRU may determine which of BWPs and/or SCells are preferred. According to embodiments, a WTRU (e.g., then, after reporting preferred SCell and/or BWP) may be configured with a frequency layer that is (e.g., more) suitable with respect to the preferred BWP and/or the SCell reported by the WTRU. For example, according to embodiments, a WTRU may be configured with both a narrowband BWP and a wideband BWP, and each BWP may be associated with different number of frequency layers. According to embodiments, a WTRU may select a wideband BWP that may be for (e.g., may help for enabling) wideband frequency layer(s).

According to embodiments, in a case of enabling a frequency layer (e.g., a case of an enabled frequency layer), the WTRU may start monitoring the bandwidth of the (e.g., enabled) frequency layer, for example, to measure received PRSs and/or transmit SRSs for positioning. According to embodiments, in a case of disabling a frequency layer (e.g., a case where a frequency layer is disabled), a WTRU may stop monitoring and/or transmitting on the bandwidth of the frequency layer.

In embodiments, the WTRU may maintain measuring PRS(s) in a frequency layer after the frequency layer has been disabled. The WTRU may be configured with a timer to determine for how long a PRS can be measured per frequency layer in case a frequency layer is disabled. In embodiments, upon disabling a frequency layer, the WTRU may trigger the timer and keep monitoring/measuring PRS. When the timer expires, the WTRU may stop measuring/monitoring the PRS(s) in the disabled frequency layer. In embodiments, the WTRU may reset the timer and keep monitoring the PRS, if the corresponding frequency layer is enabled again. For example, the WTRU may be configured with association between BWPs and frequency layers (e.g., BWP1 is associated with FL1). The WTRU may indicate to activate BWP1 by the gNB and enable frequency layer 1 FL1. After using BWP1, the gNB may switch the active BWP to a different BWP. The WTRU may start the timer and keep measuring/monitoring PRS(s) within FL1 even after switching BWP. If before expiry of the timer, the gNB indicates to the WTRU to switch back to BWP1 as the active BWP, the WTRU may then stop and reset the timer to keep monitoring PRS within FL1. If the timer expires and the WTRU is still not using BWP1 as an active BWP, the WTRU may stop monitoring the PRS(s) within FL1.

According to embodiments, a WTRU may be configured (e.g., preconfigured) with more than one measurement gap (MG), each MG having a respective and/or different duration. According to embodiments, a WTRU may be configured to determine a MG, for example, based on the enabled set of frequency layers and the active SCells, active CCs, and/or active BWPs. According to embodiments, a WTRU may: (1) request (e.g., send information requesting) the (e.g., determined) MG from the gNB, and/or (2) autonomously use the determined MG. According to embodiments, a WTRU may determine a (e.g., required) MG according to any of a subcarrier spacing and frequency location. For example, according to embodiments, a WTRU may determine a (e.g., required) MG based on subcarrier spacing of any of the active SCells, the active CCs, and the active BWPs, and the subcarrier spacing of the enabled frequency layers. For example, according to embodiments, a WTRU may select a smallest MG duration in a case where the active SCells, CCs, and/or BWPs have the same numerology as the enabled frequency layer.

According to embodiments, a WTRU may determine a (e.g., required) MG based on a frequency location of the enabled frequency layer, for example, relative to the frequency location of any of the active SCells, the active CCs, and/or the active BWPs. For example, a WTRU may select the smallest MG duration in a case where the active SCells, the active CCs, and/or the active BWPs are in the same frequency band as the enabled frequency layer. According to embodiments, a WTRU may temporarily switch to another frequency layer, for example, to perform a measurement, and may (e.g., then) switch back to an/the active BWP. According to embodiments, a WTRUs needs for a MG may depend whether a wider frequency band includes an active BWP.

According to embodiments, in a case of any of a DL positioning method and a combined DL and UL positioning method, PRSs may be transmitted from neighboring cells (e.g., non-serving cells). In such a case, a WTRU may receive information related to neighboring cells (e.g., cell ID) from a network (e.g., LMF, gNB). According to embodiments, and as referred to herein, "neighboring cell IDs" may refer to cell IDs configured for the WTRU for the purpose of positioning. According to embodiments, a WTRU may receive, from the network, an indication to associate (e.g., information indicating an association between) SCell IDs with the neighbor cell IDs used for positioning. For example, according to embodiments, a WTRU may determine to associate SCell IDs and neighboring cell IDs in a case where their IDs are the same.

According to embodiments, (e.g., as an alternative) a WTRU may receive, from the network, a table (e.g., may receive information indicating a mapping) indicating association between SCell IDs and neighboring cell IDs. According to embodiments, such an association may be a default configuration. According to embodiments, a WTRU may determine to associate neighboring cell IDs and SCell IDs, for example, in a case where a WTRU receives, from the network, an indication and/or an activation to use additional frequency layers. According to embodiments, a WTRU may determine to associate frequency layers with any of CCs or BWPs of associated SCell IDs based on any of the following parameters: ARFCN (absolute radio-frequency channel number), a bandwidth, a center frequency, a SCS, a numerology for data communication, and/or PRS.

According to embodiments, a WTRU may receive, for example, from the network, an indication (e.g., information indicating activation) to use multiple frequency layers. According to embodiments, a WTRU may stop using multiple frequency layers in a case of (e.g., satisfying, occurrence of, etc.) at least one of the following conditions: an accuracy requirement has been reached, expiration of a timer, RSRP(s) of PRS(s) associated with the additional frequency layer(s) is below a threshold, and explicit indication from the network. According to embodiments, there may be a case where an accuracy requirement has been reached. According to embodiments, in a case where a WTRU determines that the accuracy requirement has been reached, the WTRU may send, to the network, an indication to terminate use of additional frequency layers, for example, because the accuracy requirement has been satisfied.

According to embodiments, there may be a case of expiration of a timer. For example, a WTRU may be configured with a time duration during which the WTRU is expected to use additional frequency layers. In such a case, according to embodiments, the WTRU may start a timer in a further case where the WTRU starts to use the additional frequency layers. Upon expiry of the timer, the WTRU may terminate the use of additional frequency layers. According to embodiments, there may be a case of RSRP(s) of PRS(s) associated with the additional frequency layer(s) being below a threshold. According to embodiments, in such a case, a WTRU may be configured with a threshold from the network. According to embodiments, there may be a further case where: (1) RSRP for PRS(s) transmitted on the additional frequency layer(s) is below the threshold, or (2) a number of PRS(s) with RSRP(s) above the threshold is below a preconfigured number of frequency layers. In such further case, the WTRU may determine to terminate the use additional frequency layers for positioning, for example, since the WTRU may not be able to make informative measurements from the additional frequency layers.

According to embodiments, there may be a case of explicit indication from the network. That is, according to embodiments, a WTRU may receive a deactivation command from the network (e.g., LMF, gNB) via any of DCI, MAC-CE, RRC, and LPP messaging/signaling. According to embodiments, in a case where the WTRU determines to terminate the use of additional frequency layers, the WTRU may send an indication to the network (e.g., gNB, LMF) via any of RRC, UCI, MAC-CE, and LPP messaging, for example, to inform the network that the use of additional frequency layers has been terminated.

According to embodiments, a WTRU may be configured with a default number of frequency layers, and/or a default number of frequency layer IDs, on which the WTRU may (e.g., is expected to) receive PRS. According to embodiments, in a case of terminating use of additional frequency layers and/or in a case of a WTRU not finding (e.g., determining, selecting, etc.) any additional frequency layers for positioning, the WTRU may determine to use the frequency layer with the fallback frequency layer ID. According to embodiments, a WTRU may receive, from the network, (e.g., information indicating) configurations for a default number of frequency layers. According to embodiments, a WTRU may determine to choose (e.g., select) the configured number of frequency layers from among a set of frequency layers configured for the WTRU.

According to embodiments, PRS configuration parameters may include any of: a repetition factor; a resource time gap; a number of symbols; a muting pattern; a resource power; a RE offset; a symbol offset; a PRS resource ID; a PRS resource set ID; a PRS ID; a TRP ID (e.g., from which PRS is transmitted); a bandwidth; and a cell ID (e.g., from which PRS is transmitted).

Figure 4:
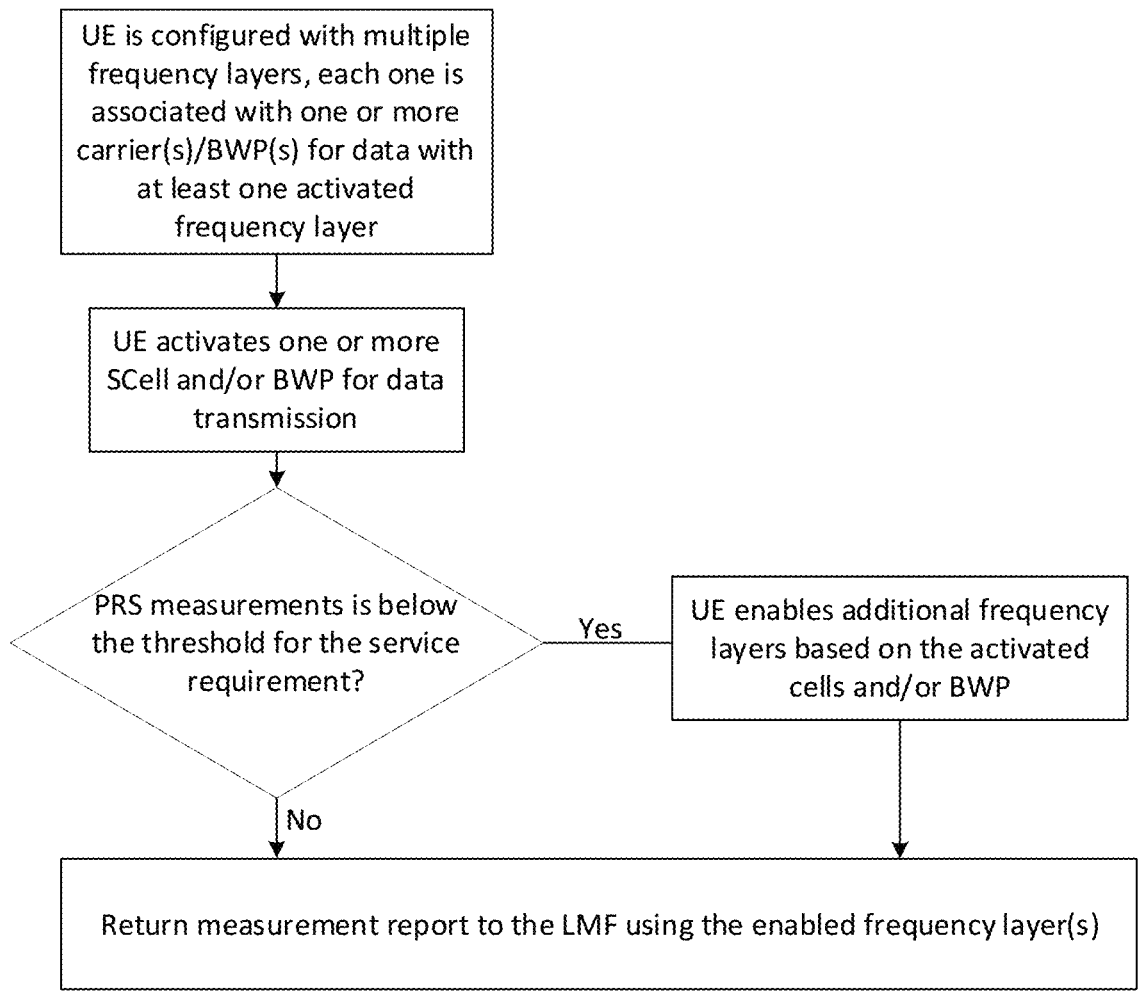
FIG. 4 is a diagram illustrating use of multiple frequency layers, according to embodiments.

FIG. 4 is a diagram illustrating use of multiple frequency layers (FLs), according to embodiments. According to embodiments, a WTRU may be configured with any number of (e.g., multiple) frequency layers. According to embodiments, a frequency layer, that is, each of multiple frequency layers, may be associated with one or more carrier(s) and/or BWP(s) for data transmission. According to embodiments, there may be a set of (e.g., configured) frequency layers that are (e.g., initially) enabled by a network (such as, the LMF). According to embodiments, a WTRU may receive an SCell activation command for one or more SCells. After measuring the PRS that are transmitted within/via the enabled frequency layers, according to embodiments, a WTRU may determine whether the measured PRS (such as, the RSRP) is above or below a (e.g., configured) threshold for the service requirements. Referring to FIG. 4, in a case where a measured RSRP is below a (e.g., configured) threshold, the WTRU may enable additional frequency layers according to a set of any of active SCells and active BWPs. The WTRU measures the PRS on the newly enables FLs. In such a case, the WTRU may (e.g., then) return (e.g., send, transmit, etc.) a measurement report to the LMF, for example, via/using the enabled frequency layers. Again, referring to FIG. 4, in a case where a measured RSRP is above or greater than the (e.g., configured) threshold, the WTRU may return (e.g., send, transmit, etc.) a measurement report to the LMF, for example, via/using the enabled frequency layers.

According to embodiments, a WTRU may receive a frequency hopping (FH) pattern for a DL RS (e.g., PRS), for example, prior to configuration of multiple layers. According to embodiments, a WTRU may receive PRS in configured frequency and time resources (e.g., in a configured hop), which may change according to a (e.g., in a predetermined) pattern, for example, so that the WTRU may make measurements on the PRS (for example on the enabled FLs). According to embodiments, a WTRU may report (e.g., transmit information indicating), to the network (e.g., LMF, gNB), a RSRP for each hop. According to embodiments, there may be a case where a WTRU determines that an RSRP corresponding to a hop is above a (e.g., preconfigured) threshold. In such a case, according to embodiments, the network may activate a frequency layer corresponding to the hop in a case where the WTRU receives an indication to use multiple frequency layers.

According to embodiments, a WTRU may determine that there is a need for increasing frequency layers. According to embodiments, a WTRU may request a network to increase the number of frequency layers (e.g., may transmit an on-demand frequency layer request to the network). According to embodiments, a WTRU may request the network to increase the number of frequency layers any of the following conditions: (1) an RSRP of a currently configured frequency layer is below a threshold, and (2) a variance and/or standard deviation of measurements (e.g., RSPR, RSTD) is above a threshold.

According to embodiments, an on-demand frequency layer request (e.g., transmitted by a WTRU) may include the following parameters: (1) a number of any of desired frequency layers, desired CCs, and desired BWPs, and (2) IDs of any of a frequency layer, a SCell, a cell, a BWP, a CC, etc. According to embodiments, in a case of a number of any of desired frequency layers, CCs, and BWPs, for example, a WTRU may be (e.g., pre-) configured by the network with a set of numbers for desired frequency layers, CCs, BWPs, etc. According to embodiments, in a case of an on-demand request including IDs, for example, the WTRU may be configured (e.g., preconfigured), by the network, with a set of IDs for any of frequency layer, SCell, cell, BWP, and CC, from which the WTRU can make a request. According to embodiments, in a case where the on-demand frequency layer request is accepted by the network, the WTRU may receive a set of any of frequency layers, CCs, BWPs, SCells, and cells, on which the WTRU may receive PRS.

According to embodiments, in a case where a WTRU receives PRS in a configured frequency layer(s), the WTRU may report (e.g., transmit information indicating) any of a RSRP, a reference signal time difference (RSTD), and an angle of arrival (AoA), in the measurement report. According to embodiments, a WTRU may indicate a number of frequency layers used in the measurement. According to embodiments, for RSTD, a WTRU may measure a time difference between a time of arrival of two PRSs (e.g., a reference PRS and a measurement PRS). According to embodiments, in a case where a WTRU reports multiple RSTDs, the WTRU may use the same reference PRS for the RSTDs. According to embodiments, a WTRU may determine to use a different number of frequency layers for each RSTD according to any of the following conditions: (1) additional frequency layers cannot be found (e.g., because aforementioned conditions cannot be satisfied); and (2) a WTRU receives explicit indication from the network to use a different number of frequency layers for an indicated pair of reference PRS and measurement PRS.

According to embodiments, in a case where a different number of frequency layers is used for each RSTD, a WTRU may indicate the number of frequency layers used for each RSTD. According to embodiments, a WTRU may receive information indicating a method for computing RSRP, for example, that is to be used by the WTRU. That is, according to embodiments, the information indicating methods to compute RSRP may include any of the following information: (1) an RSRP for PRS that is averaged within each frequency layer; (2) an RSRP for PRS that is averaged across all frequency layers; and (3) an RSRP for PRS that is averaged across a configured frequency unit (e.g., per CC, per BWP, for configured number of resource blocks).

According to embodiments, in a case where a WTRU is configured with multiple frequency layers, the WTRU may be configured with a PRS resource including a frequency resource over multiple frequency layers. According to embodiments, in such a case, in a case where the multiple frequency layers are enabled, the WTRU may start monitoring the PRS resource spanning the multiple frequency layers. According to embodiments, a WTRU may be configured with separate PRS resources for separate frequency layers. According to embodiments, in such a case where the multiple frequency layers are enabled, the WTRU may aggregate the PRS resources within the enabled frequency layers and report the measurements corresponding to aggregated PRS resources. According to embodiments, a WTRU may report, to the LMF, the average measured PRS RSRP on different frequency layers.

In embodiments, the WTRU may separately measure each PRS resource on the different enabled frequency layers without aggregation. In embodiments, the WTRU may be configured to use the same positioning calculation method for all the frequency layers (e.g., using AoA for all frequency layers or using TDOA for all frequency layers). The WTRU may then report the measurement results per frequency layers to the LMF. In embodiments, the WTRU may be configured to use different positioning calculation methods for different frequency layers. For example, the WTRU may use AoA for a first frequency layer, TDOA for a second frequency layer and RTT for a third frequency layer. The WTRU may be indicated by the network (e.g., LMF) on which positioning method to use. In embodiments, the WTRU may autonomously determine the positioning calculation method for each frequency layer.

In embodiments, the positioning calculation method for an enabled frequency layer may be based on the frequency band of the enabled frequency layer. Specific frequency bands may be associated with some frequency bands. For example, for higher frequency bands the WTRU may use AoA method for PRS measurements. The method may include, either separately or together with the bandwidth of the enabled frequency layer. For example, for larger bandwidth, TDOA may be used. The characteristics of the set of enabled frequency layers may also be included. For example, if the set of enabled frequency layers are adjacent in frequency, the WTRU may use the same positioning calculation method for the adjacent frequency layers. In embodiments, the expected time of disabling a frequency layer may also be applied within the positioning calculation method. The WTRU may determine the time for which a frequency will be disabled based on the BWP switching timer. For example, a BWP switching occurs which enables a frequency layer. The Switched BWP is a temporary switch, and the WTRU knows based on the BWP timer that it has to switch back to the default BWP. Based on the BWP timer, the WTRU may determine the expected time of disabling a frequency layer. Based on the expected time of disabling a frequency layer, the WTRU may select which positioning method to use. For example, the WTRU may select RTT if the expected time of disabling a frequency layer is larger than the next PRS resources needed for measurements.

In embodiments, the WTRU may report to the network the measurements for each frequency layer along with positioning method used for positioning calculation. The WTRU may group the frequency layers with the same positioning calculation method in the same report message. The WTRU may receive an indication from the network (e.g., LMF) with the positioning calculation method for each frequency layer. Such indication may be sent during the configuration of the frequency layer. The WTRU may further receive an update about which positioning calculation method to use for a frequency layer. For more dynamic indication, the gNB may update the positioning calculation method by sending a MAC CE or DCI to the WTRU.

In embodiments, the WTRU may be configured to measure only the PRSs within the newly enabled frequency layers. Alternatively, the WTRU may be configured to measure the PRS of all enabled frequency layers.

According to embodiments, a priority may be associated with a frequency layer. According to embodiments, a WTRU may be configured with a priority associated to a frequency layer. According to embodiments, a WTRU may prioritize a frequency layer for PRS measurements. For example, according to embodiments, a WTRU may monitor (e.g., is capable of monitoring) a maximum number of frequency layers. In a case where the number of enabled frequency layers reaches the maximum, according to embodiments, the WTRU may (e.g., start to) prioritize between the enabled frequency layers. According to embodiments, a WTRU may prioritize between the frequency layers according to a time of (e.g., at which) enabling of the frequency layer (e.g., occurs). For example, according to embodiments, a WTRU may prioritize a (e.g., newly) enabled frequency layer over an initially enabled frequency layer. According to embodiments, a WTRU may prioritize between the frequency layers according to a frequency layer ID. For example, a frequency layer with lower ID may be considered as a high priority frequency layer. According to embodiments, a frequency layer with greater ID may be considered as a high priority frequency layer. According to embodiments, a WTRU may prioritize from among a frequency layers based on the measurement results of (e.g., generated during) previous measurements. For example, according to embodiments, a WTRU may prioritize a frequency layer with higher RSRP over a frequency layer with lower RSRP.

According to embodiments, a WTRU may be (e.g., pre-) configured with any number of (e.g., multiple) MGs to measure PRSs and/or transmit SRS-positioning (SRSp) on the set of enabled frequency layers. According to embodiments, a WTRU may request the LMF to activate a set of frequency layers to use for positioning, for example, based on any of: an accuracy requirement, a latency, a measured RSRP wherein a frequency layer is below a threshold, and a measured CSI-RS corresponding to BWPs below a threshold. According to embodiments, there may be a case where a request for multiple frequency layers is granted (e.g., by the network). According to embodiments, in such a case, a WTRU may determine a MG needed for PRS measurement and/or SRSp transmission according to any of the following: (1) a total bandwidth of the enabled frequency layers; (2) a subcarrier spacing of the enabled frequency layers; (3) a subcarrier spacing of the measured frequency layers; (4) a number of enabled frequency layers; (5) a number of the frequency layers the WTRU should measure; and (6) the frequency location of the active CCs for data transmission relative to the set of enabled frequency layers. According to embodiments, a WTRU may request the selected MG from the gNB and the WTRU may wait for the gNB confirmation before applying the selected MG in the PRS measurement. According to embodiments, a WTRU may apply the selected MG in the PRS measurement without gNB confirmation.

Figure 5:
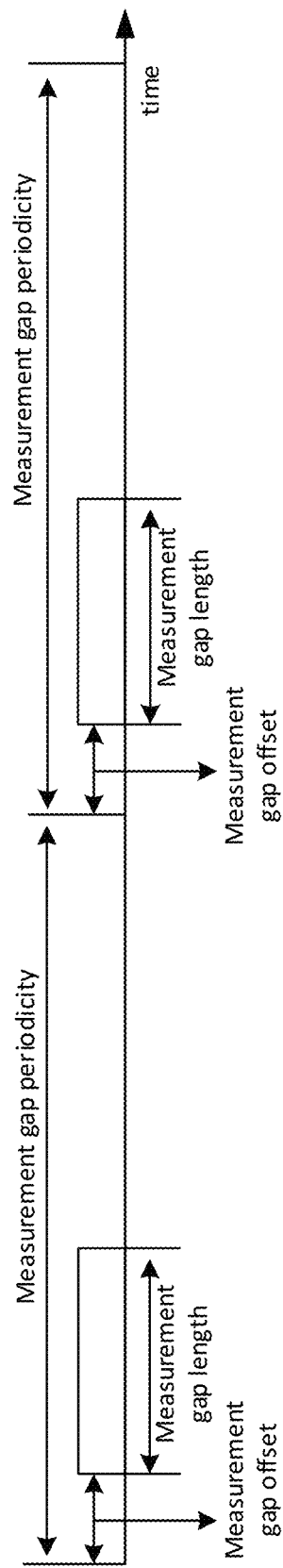
FIG. 5 is a diagram illustrating various MG parameters associated with frequency layers from a network (e.g., LMF, gNB, etc.).

According to embodiments, the WTRU may receive a list of MG parameters (e.g., MG length, MG periodicity as illustrated in FIG. 5) associated with frequency layers from the network (e.g., LMF, gNB). In the example illustrated in FIG. 5, the WTRU receives data, control channels and/or control signals outside of measurement gap. During the interval indicated by "measurement gap length", the WTRU does not receive data, control channels and/or control signals. For example, MG configuration A may be associated with frequency layer 1 and frequency layer 2, while MG configuration B may be associated with frequency layer 1. If the WTRU is configured with frequency layer 1 and layer 2 by the network, the WTRU may determine that the WTRU should request MG configuration A to the network. Each entry in the list may be associated with an ID such that the WTRU can request the network for the MG by sending the corresponding ID. In the example, "frequency layer" may be used interchangeably with SCell, CC or BWP. The WTRU may request for the MG using RRC, MAC-CE, UCI or LPP message.

According to embodiments, once the WTRU or network determines to disable multiple frequency layers (e.g., disable aggregation of frequency layers), the WTRU may determine that the initial MG (e.g., the WTRU used before aggregation of frequency layers was enabled, the MG requested by an RRC) becomes active. According to embodiments, once the WTRU or network determines to disable multiple frequency layers, the WTRU may determine to request a new MG configuration by RRC, MAC-CE, UCI or LPP message.

According to embodiments, a WTRU may perform a first method, for example, including any of the below discussed operations. According to embodiments, a WTRU may be configured with multiple frequency layers, wherein each frequency layer may be associated with one or more carriers and/or bandwidth parts for data transmission. According to embodiments, a WTRU may be triggered to enable one or more frequency layers for positioning, for example, based on any of the SCell activation/deactivation status, an active bandwidth part and the requirements of the positioning services, as well as the measurement quality of PRS. According to embodiments, a WTRU may be configured with multiple frequency layers for positioning reference signals with at least one activated frequency layer. According to embodiments, a frequency layer may be associated with any of: (1) one or more carrier(s) for data transmission, wherein such carriers may be co-located with its associated frequency layer for positioning; and (2) BWPs within carriers for data transmission, wherein a wideband BWP may be associated with multiple frequency layers and a narrowband BWP may be associated with a single frequency layer.

According to embodiments, a WTRU may receive a dynamic SCell activation/deactivation and/or BWP activation indication from the network. According to embodiments, for example, based on a condition (e.g., accuracy requirement, latency, measured RSRP with one frequency layer is below a threshold, measured CSI-RS corresponding to BWPs below a threshold), a WTRU may determine frequency layers to enable from the active SCells and/or BWPs. According to embodiments, a WTRU may report an indication, to LMF and/or the gNB, about the set of enabled frequency layers for positioning. According to embodiments, a WTRU may receive PRS in the enabled frequency layers and may transmit, to the LMF, corresponding measurements in the activated carrier and/or BWP.

According to embodiments, a WTRU may perform a second method, for example, including any of the below discussed operations. According to embodiments, a WTRU may be configured with multiple MG(s), each being associated with the set of enabled frequency layers. According to embodiments, a MG duration may depend on (e.g., be associated with) any of the total bandwidth of the enabled frequency layers, a numerology of the enabled frequency layer, and the number of enabled frequency layers. According to embodiments, a WTRU may request a MG from the pre-configured MGs based on the enabled set of frequency layers.

According to embodiments, a WTRU may be pre-configured with multiple MG(s) to measure PRS and/or transmit SRSp on the set of enabled frequency layers. According to embodiments, a WTRU may request the LMF to activate a set of frequency layers to use for positioning based on a condition (e.g., accuracy requirement, latency, measured RSRP with one frequency layer is below a threshold, measured CSI-RS corresponding to BWPs below a threshold, etc.). According to embodiments, in a case where a request for multiple frequency layers is granted, a WTRU may determine a MG needed for PRS measurement and/or SRSp transmission based on any of: (1) a total bandwidth of the enabled frequency layers; (2) a subcarrier spacing of the enabled frequency layers; (3) a number of enabled frequency layers; and (4) frequency location of the active CCs for data relative to the set of enabled frequency layers. According to embodiments, a WTRU may request the selected MG from the gNB. According to embodiments, a WTRU may receive a PRS configuration for the given number of frequency layers.

According to embodiments, a WTRU may be preconfigured to request MG(s) that are associated with the aggregated frequency layers. According to embodiments, in a case where the WTRU is preconfigured to request MG(s) associated with the aggregated frequency layers, the WTRU may activate or deactivate the frequency layer aggregation based on various conditions. According to embodiments, in the case where the WTRU may activate or deactivate the frequency layer aggregation, the activation or deactivation may be based on the acquisition of a channel in an unlicensed spectrum.

In one example, the WTRU with a reduced capability may not be able to support the bandwidth or frequency range of a normal WTRU. For example, the WTRU with a reduced capability (e.g., RedCap WTRU) may be able to support 10 MHz of bandwidth while the normal WTRU can support 100 MHz.

The RedCap WTRU may indicate its capability via capability signaling. The RedCap WTRU may be configured with PRS configurations for normal WTRUs (e.g., WTRUs that support 100 MHz of bandwidth). However, the RedCap WTRU may additionally be configured with a range of bandwidth within the normal bandwidth, e.g., a subset or a sub-bandwidth, and the range of bandwidth may correspond to the bandwidth supported by the RedCap WTRU. For example, if the RedCap WTRU can support bandwidth equivalent to 2 resource blocks (RB), while a normal WTRU may be configured with RB #1 through RB #10, the RedCap WTRU may be indicated by the network to use RB #1 to RB #2. The range of the sub-bandwidth may consist of start and end RB index numbers of the sub-bandwidth or start bandwidth index number and length of the sub-bandwidth. The sub-bandwidth may not be contiguous. The sub-bandwidth may be indicated by RB index numbers, resource element index numbers or CC/band index numbers.

In one example, the RedCap WTRUs may be configured with a PRS over the bandwidth for normal WTRUs (e.g., 100 MHZ). The WTRU may be configured with a sub-bandwidth over which the WTRU makes measurements (e.g., RSRP, RSTD) on the PRS.

The WTRU may be configured with a bandwidth dedicated for RedCap WTRUs. The WTRU may receive the configurations related to bandwidth in broadcast (e.g., posSIB) or WTRU dedicated messages (e.g., RRC, LPP message, DCI, MAC-CE).

The WTRU may be configured with a frequency hopping (FH) pattern for PRS. The WTRU may receive a configuration related to FH if the WTRU indicates its reduced capability to the network. The WTRU may receive configurations from the network (e.g., LMF, gNB). The configurations related to hopping pattern may include bandwidth or frequency range of PRS per hop, hopping duration, number of hops and location of hop in the frequency and/or time domain. The WTRU may follow the hopping pattern to make measurements on the PRS. The bandwidth of hop may be smaller or equal to the sub-bandwidth the WTRU can support.

Figure 6:
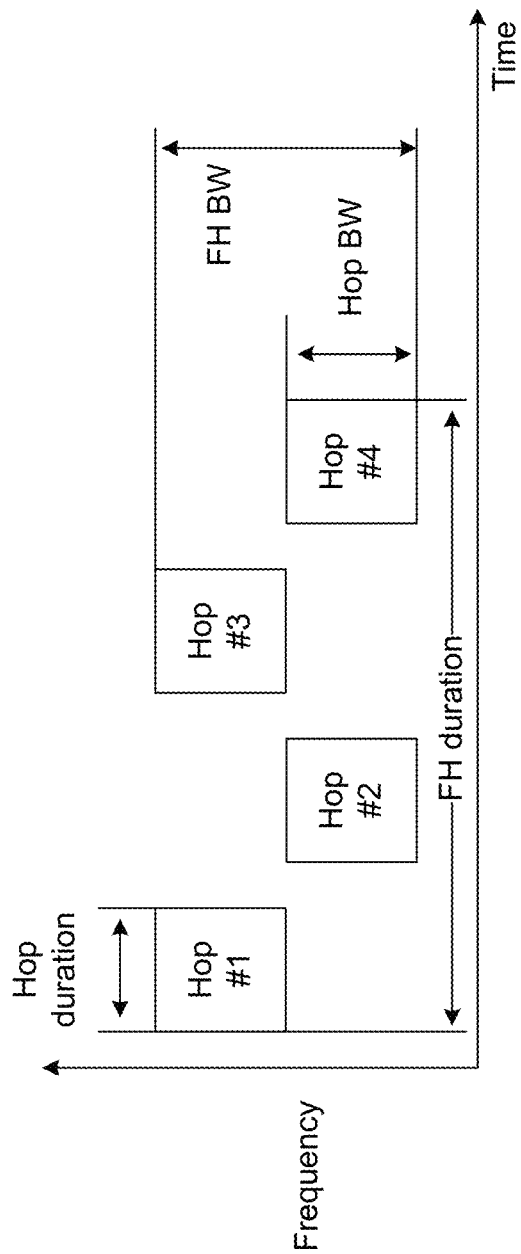
FIG. 6 is a diagram illustrating a frequency hopping pattern and parameters therefore.

An example of a FH pattern for PRS and its parameters are shown in FIG. 6. In the example, a 2-hop pattern is illustrated. The WTRU may receive PRS in each hop. Each hop may be associated with a hop index number (e.g., Hop #1 or Hop #2 in a 2-hop pattern). The WTRU may receive configurations for duration in the time and/or frequency domain. The example indicated in FIG. 6 where time and frequency duration of each hop are indicated by "Hop Duration" and "Hop bandwidth", respectively. Each hop may not overlap in time and/or frequency domain and hops may cover contiguous or non-contiguous bandwidth. Each hop may be configured consecutively (e.g., back-to-back) or non-consecutively (e.g., non back-to-back).

The WTRU may receive configurations related to a duration of FH in the time and/or frequency domain. An example of the duration for FH in time and the frequency domain are illustrated in FIG. 6 by "FH duration" and "FH bandwidth". The FH duration or hop duration may be indicated by start/end time (e.g., indicated by symbol, slot, frame or subframe number) or start time and duration (e.g., indicated by number of symbols, slots, frames or subframes). The Hop duration may be indicated by the number of symbols, slots, frames or subframes. Bandwidth related to Hop bandwidth or FH bandwidth may be expressed in terms of the number of resource element(s), RB(s), CC(s) and/or band(s).

Each hop may be configured with the number of repetitions. For example, the TRP may transmit a hop of PRS K times. The example illustrated in FIG. 6 corresponds to a case when K=1. The WTRU may receive the number of repetitions per hop, K, from the network.

The WTRU may receive the aforementioned configurations in a broadcast message (e.g., posSIB), LPP message, RRC, MAC-CE or DCI. The WTRU may receive an indication from the network in the broadcast message that PRS is transmitted following a FH pattern. Based on the indication, the WTRU may receive an RRC, MAC-CE or DCI message from the network regarding details of the PRS hopping pattern configurations. The frequency hop may be activated or deactivated by MAC-CE by the network. The WTRU may send a request to the network for activation and/or deactivation of FH.

Figure 7:
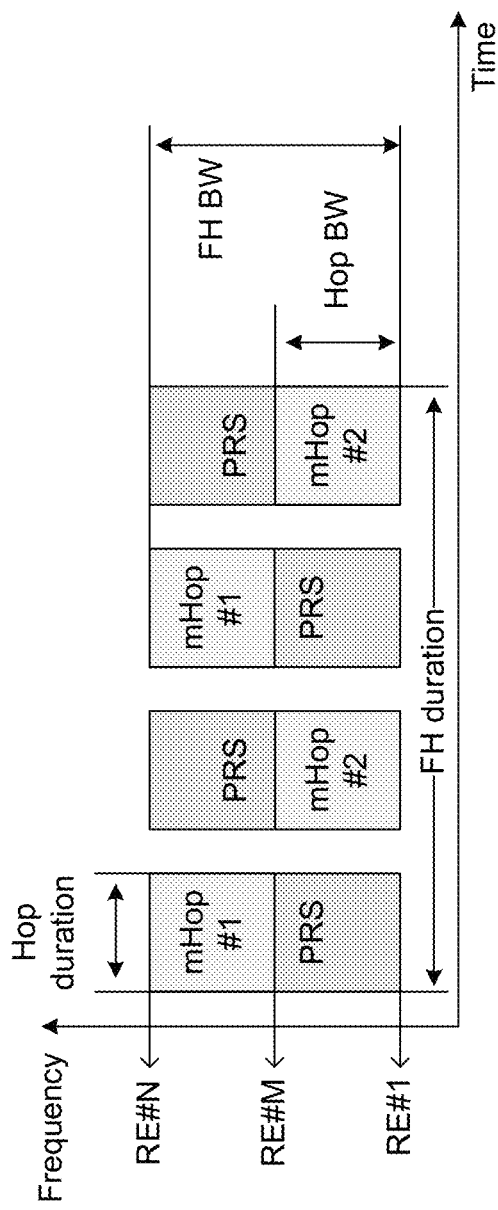
FIG. 7 is a diagram illustrating hopping during measurements on PRS.

In one example, the WTRU may make measurements on PRS based on a hopping pattern. An example of hopping during measurements with 2 hops on PRS is shown in FIG. 7. In the example, the WTRU receives a configuration for PRS whose bandwidth spans from resource element #1 (RE #1) to RE #N. The WTRU also receives a configuration for measurement hopping (mHop) where the first and second hop may span from RE #1 to RE #M and from RE #M+1 to RE #N, respectively. In the example, it is assumed that a "Hop bandwidth" or bandwidth associated with measurements performed during a first hop (e.g., mHop #1) is M and that the "Hop bandwidth" or bandwidth associated with measurements performed during a second hop (e.g., mHop #2) is N-M. Thus during the mHop #1, the WTRU is expected to measure bandwidth corresponding to mHop #1 and return measurements (e.g., RSRP, WTRU Rx-Tx, RSTD) to the network. Similarly, during the mHop #2, the WTRU is expected to measure bandwidth corresponding to mHop #2 and return measurements to the network. If indicated by the network, the WTRU may determine to combine measurements corresponding to measurement hops and report the combined measurements to the network. An example of combination of measurements may be averaging.

Figure 8:
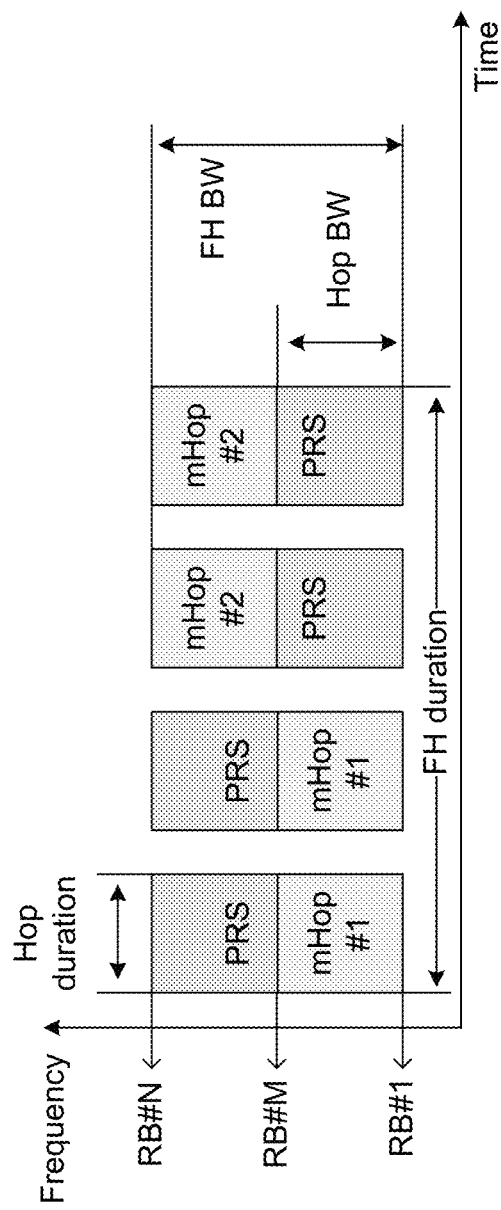
FIG. 8 is a diagram illustrating hopping during measurements on PRS, and repetitions per hop, wherein mK=2.

The WTRU may determine to make measurements for a hop in consecutive occasions, mK. An example is illustrated in FIG. 8 where mK=2. The WTRU may receive a configuration for mK from the network. In the example, the WTRU may make measurements on PRS and process the measurements for corresponding mHop #1, which spans from RB #1 to RB #M. The WTRU may repeat the measurements and processing for the next occasion when mK=2. Subsequently, the WTRU may make measurements on PRS and process the measurements corresponding mHop #2, which spans from RB #M+1 to RB #N.

In one example, the WTRU may determine the Hop bandwidth based on its capability for the support of bandwidth. For example, the WTRU may determine to set Hop bandwidth equal to the sub-bandwidth the WTRU can support. The WTRU may determine the mHop pattern based on a configured pattern. The WTRU may include the hopping pattern in the measurement report.

In one example, the WTRU may determine the parameters related to hop-based measurements based on the PRS configuration. The WTRU may receive association rules between PRS configuration and hop-based measurement parameters. In embodiments, the potential examples of the association rules may include an association between bandwidth of PRS and Hop bandwidth for hop-based measurements, an association between PRS repetition factors and repetition of measurements (e.g., mK) for hop-based measurements, an association between bandwidth of PRS and number of hops for hop-based measurements and an association between bandwidth of PRS and hopping pattern for hop-based measurements.

The WTRU may determine the Hop bandwidth based on bandwidth of PRS. If the bandwidth of PRS is not an integer multiple of the Hop bandwidth, the WTRU may indicate start and/or end position in the frequency domain for each Hop bandwidth. In one alternative, the WTRU may indicate to the network the duration of Hop bandwidth in the frequency domain and return measurements for the remaining resources in the frequency domain. As an example, if N and L are the bandwidth of PRS and Hop bandwidth, respectively, the WTRU may also report the measurements correspond to the remaining bandwidth N-LT where T may be an integer.

The WTRU may determine parameters for hop-based measurements (e.g., the number of repetitions) in the measurements based on measurement conditions (e.g., RSRP) and/or channel conditions (e.g., Doppler, number of multipaths). As an example, if the WTRU may be configured with a candidate of repetition factors for measurements, mk. If the average RSRP across all hops is below the preconfigured threshold, the WTRU may determine to set mK at the highest number. The WTRU may receive an association rule from the network between range(s) of RSRP and mK. The WTRU may determine mk based on Doppler information (e.g., Doppler spread/shift). For example, the WTRU may receive an association rule form the network between range (s) of Doppler shift(s) and mK. The WTRU may determine hopping pattern and number of hops based on Doppler shift according to a mapping rule. The WTRU may receive an association rule form the network between range(s) of Doppler shift(s) and number of hops.

In another example, the WTRU may be configured with hopping configurations (e.g., frequency hopping BW, frequency hopping duration, hopping bandwidth, hopping duration) for SRSp transmission. For example, the frequency hopping bandwidth may correspond to the SRSp bandwidth configured for the WTRU. The WTRU may determine frequency hopping configurations based on the number of hops or the bandwidth allocated for SRSp. The WTRU may use the preconfigured association rule which associates hopping parameters and the bandwidth of SRSp.

Figure 9:
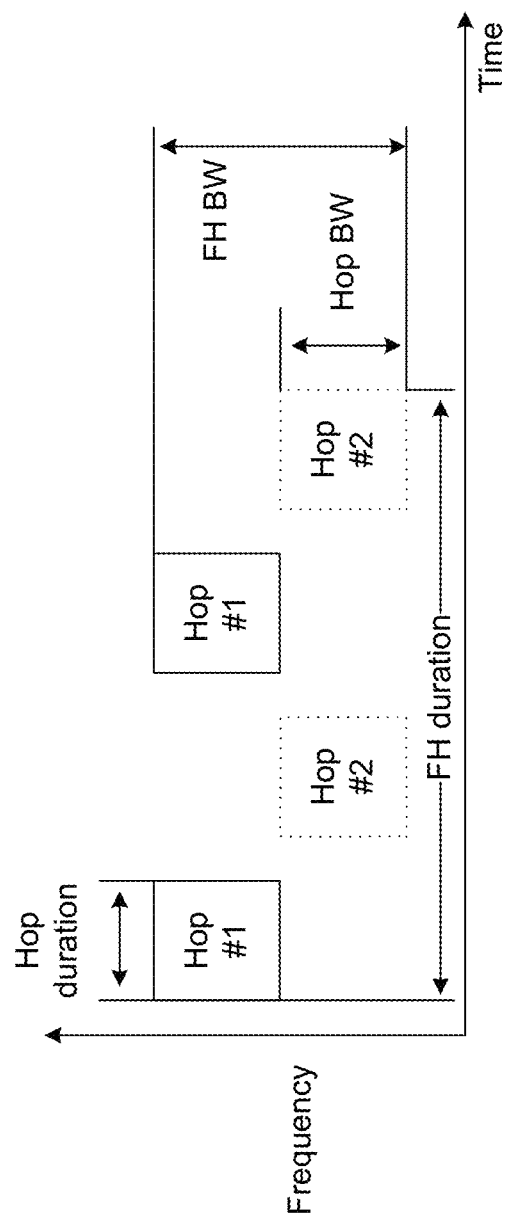
FIG. 9 is a diagram illustrating a muting pattern, "10", for PRS hopping.
Figure 10:
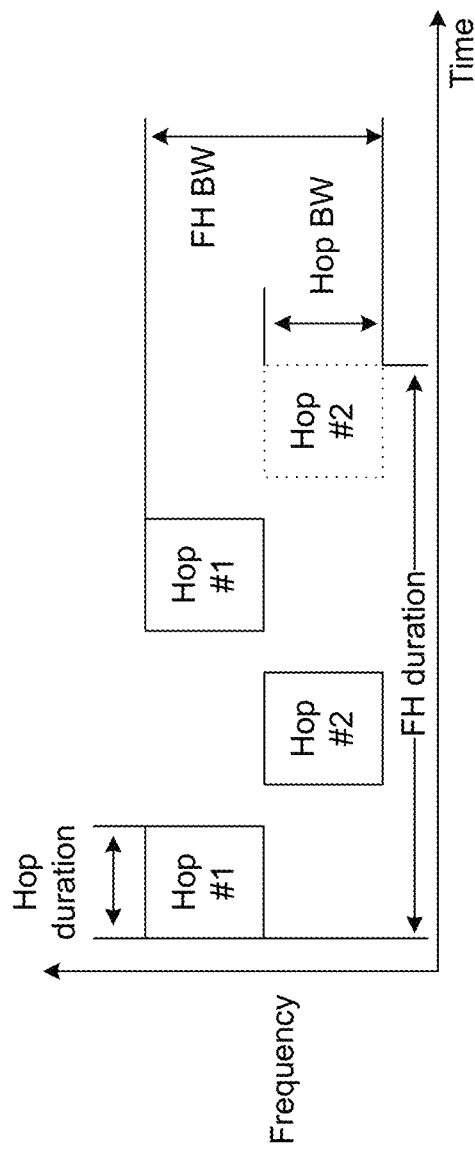
FIG. 10 is a diagram illustrating a muting pattern, "1110", for PRS hopping.

The WTRU may receive a muting pattern configuration. The WTRU may be configured with a muting pattern on the hopping pattern for PRS transmission. The muting pattern may indicate which hop is muted by the network. Based on the muting pattern, the WTRU may determine reception of PRS. The muting pattern may be expressed in terms of bitmap where each bit in the bitmap may correspond to a hop in the FH pattern(s). An example of a muting pattern for PRS frequency hopping is shown in FIG. 9. The WTRU receives a muting pattern "10" for a FH pattern with 2-hops. The WTRU may receive PRS corresponding to "Hop #1". In another example illustrated in FIG. 10, the WTRU may receive a muting pattern "1110" which indicates the WTRU may receive PSR in both first and second Hop #1, first Hop #2, but not during 2nd Hop #2 in a pattern.

Depending on capability, the WTRU may include multipath measurements in the report. Examples of multipath measurements are RSRP per path, relative RSRP per path compared to a reference path/PRS, time difference of arrival per path, relative time difference of arrival per path with respect to a reference path/PRS.

The WTRU may receive a configuration from the network for measurement gap which correspond to FH for PRS. The WTRU may send a request to the network for a measurement gap to receive PRS according to a FH pattern. In another example, the WTRU may receive a configuration related to prioritization window associated with a FH pattern. The WTRU may receive a priority level of PRS compared to other downlink reference signals or channels. In another example, the WTRU may determine to enable hop-based measurements and measurement processing based on whether a measurement gap or prioritization window may be configured for PRS. The WTRU may determine to enable hop-based measurements if a measurement gap is configured for PRS. The WTRU may determine to disable hop-based measurements if a prioritization window is configured for PRS.

The WTRU may determine to enable or disable hop-based measurements and measurement processing based on a priority level associated with the prioritization window. For example, if a priority level of "low" is configured for PRS within the prioritization window, the WTRU may determine to disable the hop-based measurements. The WTRU may determine to enable the hop-based measurements and measurement processing if the priority level for PRS within the prioritization window is configured as "high".

If the WTRU determines to disable the hop-based measurements, the WTRU may determine to make measurement on the configured bandwidth, not performing measurements based on a hopping pattern. The bandwidth for measurements may be a sub-bandwidth configured by the network. The WTRU may determine the bandwidth for measurement based on the default configuration configured/broadcasted by the network. The WTRU may also determine bandwidth for the measurement based on PRS configuration. For example, the WTRU may determine to measure a sub-bandwidth which may be closest to the center or edge of the bandwidth of PRS. The default bandwidth or sub-bandwidth may be specified.

According to embodiments, the WTRU sends its capability information (e.g., reduced bandwidth support) to the network. The WTRU receives PRS configuration from the network. The WTRU further receives a configuration related to a prioritization window (e.g., priority level of PRS). The WTRU receives an association rule between measurement parameters (e.g., number of repetitions) and channel condition from LMF within the network. The WTRU may further receive Doppler shift information of the channel from the gNB within the network. The WTRU then determines a measurement pattern. The WTRU determines to enable hop-based measurements if the priority level of PRS is high. If the hop-based measurements is enabled, the WTRU determines hop parameters based on the Doppler shift information and association rule (e.g., the WTRU determines the number of repetitions in measurements based on Doppler shift). The WTRU determines to disable hop-based measurements if the priority level of PRS is low. If the hop-based measurement is disabled, the WTRU makes measurements for the default bandwidth. The WTRU receives PRS and makes measurements (e.g., RSRP, RSTD) according to the mHop pattern. The WTRU sends a measurement report (e.g., RSRP) to the network.

In embodiments, the WTRU may be configured with a frequency hopping pattern for SRS for positioning. The WTRU may receive a hopping pattern that spans over time (e.g., symbol(s), slot(s)) and frequency (e.g., frequency layers, BWP, sub-band of BWP, band, sub-band). For example, the WTRU may be configured with a pattern similar to the one shown in FIG. 6. The WTRU may receive the configuration in an RRC and/or LPP message from the network (e.g., gNB, LMF). A frequency hopping pattern may be configured per frequency layer, PRS resource set or PRS resource. In embodiments, the WTRU may be configured with more than one frequency hopping pattern. The WTRU may determine a frequency hopping pattern based on measurement conditions (e.g., RSRP) of time and/or frequency resources for SRSp transmission. For example, the WTRU may determine to transmit SRSp for the selected frequency hopping pattern if measurements corresponding to the resources for the hopping pattern are above the preconfigured threshold.

In embodiments, the WTRU may be configured with an UL data transmission that uses more than one BWP, bands sub-BWP, and or sub-band. The WTRU may determine to use the same resources for data transmission for transmission of SRSp, e.g., for positioning. In embodiments, the WTRU may receive configurations for more than one frequency layer for positioning. The WTRU may determine to associate a frequency layer with each band/sub-band/BWP/sub-BWP for data transmission, if one or more conditions are satisfied. In embodiments, the WTRU may receive an indication from the network to associate frequency layer(s) to band/sub-band/BWP/sub-bWP for data transmission. In embodiments, the RSRP corresponding to the configured resource corresponding for SRSp may be below the preconfigured threshold.

In embodiments, the WTRU may determine to use more than one band/sub-band/BWP/sub-BWP based on the configuration. For example, the WTRU may receive a configuration to use N bands/sub-bands/BWPs/sub-BWPs or up to N bands/sub-bands/BWPs/sub-BWPs. In embodiments, based on the required QoS (e.g., RSRP), the WTRU may determine how many bands/sub-bands/BWPs/sub-BWPs are needed for SRSp transmission. Further, the WTRU may send SRSp across bands/sub-bands/BWPs/sub-BWPs during a time duration or follow a configured hopping pattern.

Figure 11:
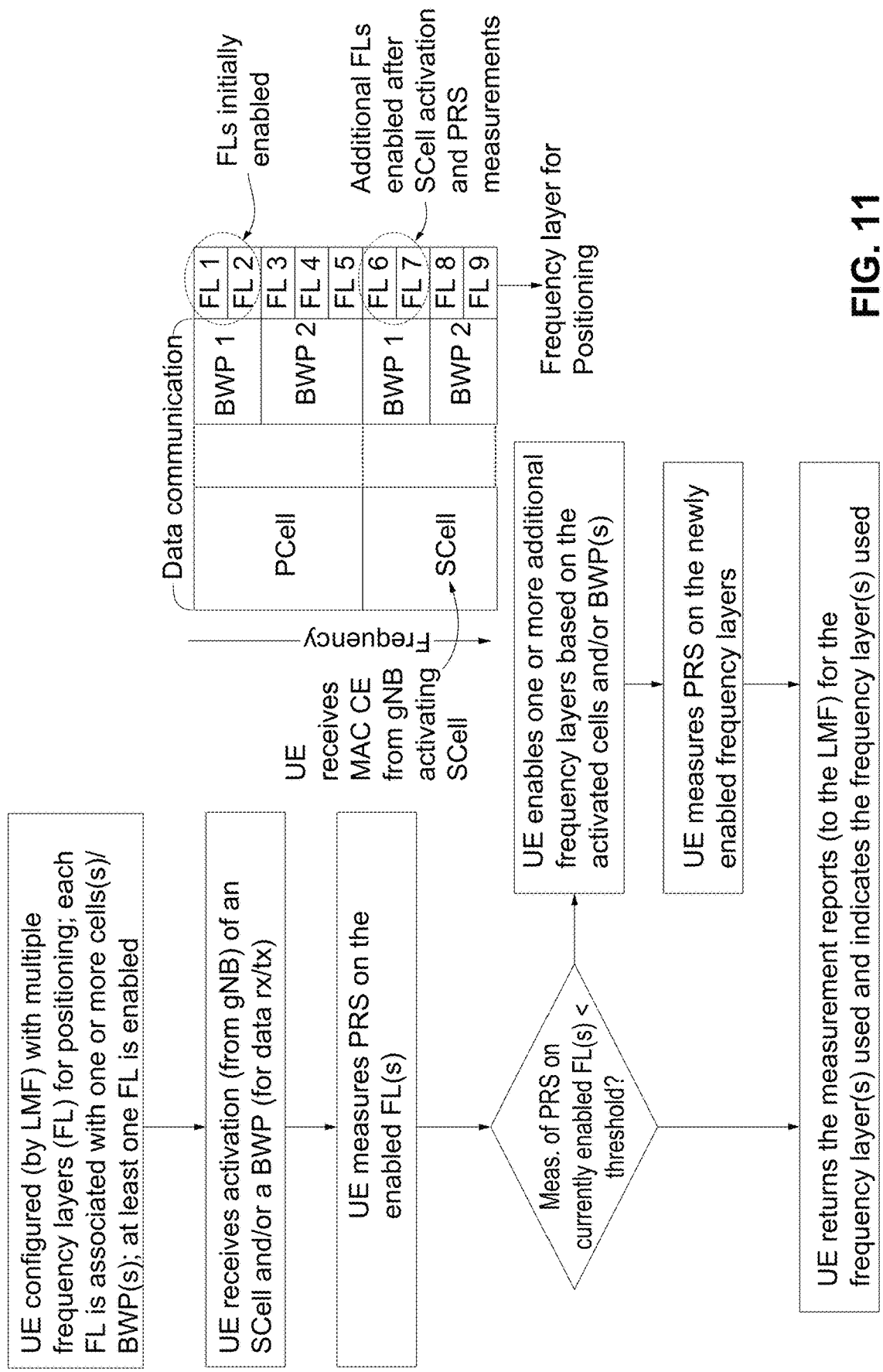
FIG. 11 is an example of procedures for the WTRU to enable frequency layers for positioning.

The WTRU may also receive a table associating a hopping pattern and a number bands/sub-bands/BWPs/sub-BWPs so that a different frequency hopping pattern may be applied to SRSp transmission over different number of bands/sub-bands/BWPs/sub-BWPs In embodiments, the WTRU may be configured with multiple frequency layers for positioning, where each frequency layer is associated with a bandwidth part (BWP). As shown in the example of FIG. 11, the WTRU may be configured with two cells, i.e., PCell and SCell, where each cell may be configured with two BWPs, i.e., BWP1 and BWP2. {FL1, FL2} associated with BWP1 of PCell, and {FL3, FL4, FL5} associated with BWP2 of PCell. {FL6, FL7} associated with BWP1 of SCell, and {FL8, FL9} associated with BWP2 of SCell. Initially FL1 and FL2 may be enabled and BWP1 of the PCell may be the active BWP. Based on the required data throughput, the gNB activates SCell for the WTRU and indicates to the WTRU to use BWP1 of the SCell as active BWP. For example, the WTRU may receive a MAC CE from gNB, activating SCell. In embodiments, the WTRU may enable additional frequency layers based on the activated cells and active BWP. This enablement may occur during the measurement of PRS using the enabled frequency layers (i.e., FL1 and FL2), if the WTRU determines that the measured PRS is below a configured threshold. In the example shown in FIG. 11, the WTRU enables FL6 and FL7 associated with BWP1 of SCell. The WTRU then measures the newly enabled frequency layers and return the measurements report to the LMF along with the indication of the frequency layers used during the measurements.

For purposes of the above descriptions, "PRS" and "SRS" or "SRS for positioning" may be used interchangeably. Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

In the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A wireless transmit/receive unit (WTRU) comprising a processor configured to:
   receive configuration information from a network, the configuration information indicating a plurality of frequency layers (FLs), wherein each FL is associated with a respective set of one or more positioning reference signal (PRS) resources, wherein the configuration information indicates a respective bandwidth and respective frequency location information for each FL of the plurality of FLs;
   receive at least a first PRS associated with a first set of one or more PRS resources corresponding to a first FL of the plurality of FLs and a second PRS associated with a second set of one or more PRS resources corresponding to a second FL of the plurality of FLs;
   determine that a repetition factor and a comb factor are common for the first set of one or more PRS resources corresponding to the first FL and the second set of one or more PRS resources corresponding to the second FL;
   determine a plurality of measurement reporting values based on at least the first PRS associated with the first set of one or more PRS resources corresponding to the first FL of the plurality of FLs and the second PRS associated with the second set of one or more PRS resources corresponding to the second FL of the plurality of FLs, wherein the plurality of measurement reporting values corresponds to at least a first measurement reporting value indicating an aggregate reference signal received power measurement value associated with at least the first and second FLs and a second measurement reporting value indicating an aggregate reference signal time delay measurement value associated with at least the first and second FLs; and
   send a measurement report comprising the first and second measurement reporting values and indications of at least the first and second FLs.

2. The WTRU as in claim 1, wherein the processor is processor configured to determine that the first measurement reporting value is below a configured threshold, and send in the measurement report a request to receive additional PRS associated with an additional set of one or more PRS resources corresponding to an additional FL of the plurality of FLs.

3. The WTRU as in claim 2, wherein the processor is processor configured to receive a second configuration information from a network, the second configuration information indicating a plurality of FLs for positioning measurements for a third PRS associated with a third set of one or more PRS resources corresponding to a third FL of the plurality of FLs.

4. The WTRU as in claim 1, wherein the processor is processor configured to activate at least the first and second FLs in accordance with the measurement report.

5. The WTRU as is claim 1, wherein the measurement report further comprises an indication of a number of FLs associated with the first and second measurement reporting values.

6. The WTRU as in claim 1, wherein processor configured to determine at least one symbol is common for the first set of one or more PRS resources corresponding to the first FL and the second set of one or more PRS resources corresponding to the second FL.

7. The WTRU as in claim 6, wherein the at least one symbol is an orthogonal frequency-division multiplexing (OFDM) symbol.

8. A method performed by a wireless transmit/receive unit (WTRU) comprising the steps of:
   receiving configuration information from a network, the configuration information indicating a plurality of frequency layers (FLs), wherein each FL is associated with a respective set of one or more positioning reference signal (PRS) resources, wherein the configuration information indicates a respective bandwidth and respective frequency location information for each FL of the plurality of FLs;
   receiving at least a first PRS associated with a first set of one or more PRS resources corresponding to a first FL of the plurality of FLs and a second PRS associated with a second set of one or more PRS resources corresponding to a second FL of the plurality of FLs;
   determining that a repetition factor and a comb factor are common for the first set of one or more PRS resources corresponding to the first FL and the second set of one or more PRS resources corresponding to the second FL;
   determining a plurality of measurement reporting values based on at least the first PRS associated with the first set of one or more PRS resources corresponding to the first FL of the plurality of FLs and the second PRS associated with the second set of one or more PRS resources corresponding to the second FL of the plurality of FLs, wherein the plurality of measurement reporting values corresponds to at least a first measurement reporting value indicating an aggregate reference signal received power measurement value associated with at least the first and second FLs and a second measurement reporting value indicating an aggregate reference signal time delay measurement value associated with at least the first and second FLs; and sending a measurement report comprising the first and second measurement reporting values and indications of at least the first and second FLs.

9. The method as in claim 8, further comprising determining that the first measurement reporting value is below a configured threshold, and sending in the measurement report a request to receive additional PRS associated with an additional set of one or more PRS resources corresponding to an additional FL of the plurality of FLs.

10. The method as in claim 9, further comprising receiving a second configuration information from a network, the second configuration information indicating a plurality of FLs for positioning measurements for a third PRS associated with a third set of one or more PRS resources corresponding to a third FL of the plurality of FLs.

11. The WTRU as in claim 8, further comprising activating the first and second FLs in accordance with the measurement report.

12. The method as is claim 8, wherein the measurement report further comprises an indication of a number of FLs associated with the first and second measurement reporting values.

13. The method as in claim 8, further comprising determining that at least one symbol is common for the first set of one or more PRS resources corresponding to the first FL and the second set of one or more PRS resources corresponding to the second FL.

14. The method as in claim 13, wherein the at least one symbol is an orthogonal frequency-division multiplexing (OFDM) symbol.

* * * * *

UNITED STATES PATENT AND TRADEMARK OFFICE
CERTIFICATE OF CORRECTION

PATENT NO. : 12,114,196 B1  
APPLICATION NO. : 18/675514  
DATED : October 8, 2024  
INVENTOR(S) : Aata El Hamss et al.

Page 1 of 1

It is certified that error appears in the above-identified patent and that said Letters Patent is hereby corrected as shown below:

In the Claims

In Claim 2: Column 42, Line 16, delete "processor is processor", and insert --processor is--

In Claim 3: Column 42, Line 23, delete "processor is processor", and insert --processor is--

In Claim 4: Column 42, Line 30, delete "processor is processor", and insert --processor is--

In Claim 6: Column 42, Line 37, delete "processor", and insert --the processor is--

Signed and Sealed this  
Tenth Day of June, 2025

Coke Morgan Stewart  
*Acting Director of the United States Patent and Trademark Office*